US012800401B2

(12) United States Patent
Geelen

(10) Patent No.: US 12,800,401 B2
(45) Date of Patent: Nov. 17, 2026

(54) METHODS AND SYSTEM FOR DETERMINING ABERRATIONS OF A PROJECTION SYSTEM

(71) Applicant: ASML NETHERLANDS B.V., Veldhoven (NL)

(72) Inventor: Paul Jean Maurice Geelen, Lommel (BE)

(73) Assignee: ASML NETHERLANDS B.V., Veldhoven (NL)

( * ) Notice: Subject to any disclaimer, the term of this patent is extended or adjusted under 35 U.S.C. 154(b) by 43 days.

(21) Appl. No.: 19/108,715

(22) PCT Filed: Sep. 14, 2023

(86) PCT No.: PCT/EP2023/075234

§ 371 (c)(1),
(2) Date: Mar. 4, 2025

(87) PCT Pub. No.: WO2024/074276

PCT Pub. Date: Apr. 11, 2024

(65) Prior Publication Data

US 2026/0071918 A1 Mar. 12, 2026

(30) Foreign Application Priority Data

Oct. 6, 2022 (EP) .................................... 22199929

(51) Int. Cl.
*G01J 9/02* (2006.01)

(52) U.S. Cl.
CPC ..... *G01J 9/0215* (2013.01); *G01J 2009/0219* (2013.01)

(58) Field of Classification Search
CPC . G03F 7/706; G01J 9/0215; G01J 2009/0219; G01M 11/005
See application file for complete search history.

(56) References Cited

U.S. PATENT DOCUMENTS

2004/0114119 A1* 6/2004 Van Der Laan ........ G03F 7/706 355/71
2004/0156041 A1 8/2004 Shiode
(Continued)

FOREIGN PATENT DOCUMENTS

DE 10 2018 204626 4/2019
EP 3719545 10/2020
(Continued)

OTHER PUBLICATIONS

International Search Report and Written Opinion issued in corresponding PCT Patent Application No. PCT/EP2023/075234, dated Sep. 19, 2023.
(Continued)

*Primary Examiner* — Michelle M Iacoletti
*Assistant Examiner* — Mohamed Doumbia
(74) *Attorney, Agent, or Firm* — Pillsbury Winthrop Shaw Pittman, LLP

(57) ABSTRACT

Methods, and corresponding systems for, determining one or more aberrations of a projection system (for example a projection system of a lithographic apparatus) are disclosed. One method includes performing a phase stepping or phase scanning process using a first patterning device (at object level) that includes a specular diffraction grating. Also disclosed is a calibration method for determining calibration data which characterizes any differences between: aberrations of a projection system determined using a diffusive grating at object level and aberrations of a projection system determined using a specular grating at object level.

20 Claims, 11 Drawing Sheets

(56) References Cited

U.S. PATENT DOCUMENTS

| | | | | |
|---|---|---|---|---|
| 2010/0284064 | A1* | 11/2010 | Kruizinga | G02B 5/1838 359/359 |
| 2021/0026250 | A1 | 1/2021 | Tang et al. | |
| 2021/0150116 | A1 | 5/2021 | Fan et al. | |

FOREIGN PATENT DOCUMENTS

| | | | | |
|---|---|---|---|---|
| WO | 2019149468 | | 8/2019 | |
| WO | WO-2019149468 | A1 * | 8/2019 | G03F 7/706 |

OTHER PUBLICATIONS

Van De Kerkhof, M et al., "Diffuser concepts for in-situ wavefront measurements of EUV projection optics", Proc. of SPIE, vol. 10583, pp. 1-10 (2018).

* cited by examiner

METHODS AND SYSTEM FOR DETERMINING ABERRATIONS OF A PROJECTION SYSTEM

CROSS-REFERENCE TO RELATED APPLICATIONS

This application is the U.S. national phase entry of PCT Patent Application No. PCT/EP2023/075234 which was filed on Sep. 14, 2023, which claims priority of European Patent Application No. 22199929.5 which was filed on Oct. 6, 2022 and which is incorporated herein in its entirety by reference.

FIELD

The present invention relates to methods, and corresponding systems for, determining one or more aberrations of a projection system. The projection system may be the projection system of a lithographic apparatus. The present invention also relates to a calibration method for determining calibration data which characterizes any differences between: aberrations of a projection system determined using a diffusive grating at object level and aberrations of a projection system determined using a specular grating at object level.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern at a patterning device (e.g., a mask) onto a layer of radiation-sensitive material (resist) provided on a substrate.

To project a pattern on a substrate a lithographic apparatus may use electromagnetic radiation. The wavelength of this radiation determines the minimum size of features which can be formed on the substrate. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Radiation that has been patterned by the patterning device is focused onto the substrate using a projection system. The projection system may introduce optical aberrations, which cause the image formed on the substrate to deviate from a desired image (for example a diffraction limited image of the patterning device).

It may be desirable to provide methods and apparatus for accurately determining such aberrations caused by a projection system such that these aberrations can be better controlled.

SUMMARY

According to a first aspect of the present disclosure, there is provided a method of determining one or more aberrations of a projection system, the method comprising: performing a phase stepping or phase scanning process, the phase stepping or phase scanning process comprising: illuminating a first patterning device with illumination radiation, wherein the first patterning device comprises a specular diffraction grating arranged to form a plurality of first diffraction beams, the first diffraction beams being separated in a shearing direction: projecting, with the projection system, at least part of the plurality of first diffraction beams onto a sensor apparatus comprising: a second patterning device arranged to receive the first diffraction beams from the projection system and to form a plurality of second diffraction beams from each of the first diffraction beams; and a radiation detector arranged to receive at least a portion of the second diffraction beams; and moving at least one of the first and second patterning devices in the shearing direction such that an intensity of radiation received by each part of the radiation detector that receives radiation varies as a function of the movement in the shearing direction so as to form an oscillating signal; and determining one or more aberrations of the projection system from the oscillating signals determined by each part of the radiation detector that receives radiation.

It will be appreciated that a specular diffraction grating is intended to mean a reflective diffraction grating comprising a pattern of reflective portions and radiation absorbing portions wherein reflection from the reflective portions is predominantly specular or normal reflection. Put differently, a specular diffraction grating is intended to mean a reflective diffraction grating which causes minimal diffusion of radiation incident thereon. It will be appreciated that this may be achieved my ensuring that the reflective portions of the specular diffraction grating are sufficiently smooth. In particular, any imperfections or surface roughness of the reflective portions of the specular diffraction grating may be small compared to the wavelength of illumination radiation which the specular diffraction grating scatters in use.

It will be appreciated that the method is of the form of shearing interferometry.

The method according to the first aspect may be suitable for use within a lithographic apparatus. The first patterning device may be disposed at reticle level (i.e. in an object plane of the lithographic apparatus) and the sensor apparatus may be disposed at wafer level (i.e. in an image plane of the lithographic apparatus). In particular, the method according to the first aspect may be suitable for use within an extreme ultraviolet (EUV) lithographic apparatus. That is, the illumination radiation may comprise EUV radiation.

During a lithographic process, radiation is used to form a typically diffraction-limited image on a substrate (such as, for example, a resist-coated wafer) using a projection system. In practice, the projection system will not form a perfect image but rather will be subject to some level of aberrations. Such aberrations represent distortions of the wavefront of light approaching a point in an image plane of the projection system from a spherical wavefront (and may, in general, be dependent on a position in the pupil plane or, alternatively, the angle at which radiation approaches the image plane of the projection system). It is desirable to minimise aberrations and therefore it is desirable to perform a measurement of the aberrations, which may be used as part of a feedback loop to minimise aberrations as far as possible.

The measurement of aberrations of the projection system of known EUV lithographic apparatus typically uses the same (EUV) radiation for the aberration measurements as is used for exposure of wafers during the lithography process. This is clearly advantageous as it is the aberrations caused when imaging with the EUV radiation that it is desirable to measure and minimise (as these affect the image formed on the wafers). However, the radiation is provided to the reticle level of the lithography apparatus via an illumination system that is arranged to optimize the angular distribution of the EUV radiation at reticle level for lithographic imaging performance. In particular, although known EUV lithographic apparatus allow for the angular distribution of the EUV radiation at reticle level (which may be referred to as the illumination mode) to be controlled to an extent it does not allow for uniform pupil fill illumination (i.e. illumination of each field point at reticle level with a uniform cone of radiation). The illumination modes achievable by the illumination system would not probe the full pupil plane of the projection system. As a result, the measurement of aberrations of the projection system of known EUV lithographic apparatus typically uses a diffusive reflective grating as a first patterning device (at reticle level). The diffusive reflective grating is arranged to fill the entire pupil plane of the projection system so that the whole of the projection system is probed during the aberration measurement.

However, the inventor of the present invention has realized that such a diffusive reflective diffraction grating can introduce significant errors in the measurement of some aberrations (for example the amplitude of some Zernike orders in an aberration map of the projection system). Typically, a diffusive reflective grating for an aberration measurement system is formed by forming a rough surface to which a reflective grating pattern is applied. For example, a uniform reflective layer may be applied to the rough surface and a pattern of radiation absorbing portions is formed over the reflective layer. However, the inventor of the present invention has realized that the aberration measurements performed using the diffusive reflective diffraction grating are dependent on the specific rough surface used to cause the diffusion.

However, despite the strong prejudice that exists in the art that diffusion should be used to fully probe the projection system, the inventor of the present invention has arrived at the surprising realization that measurements using a specular diffraction grating can provide an improved aberration measurement, at least for some aberrations (i.e. Zernike orders). In particular, even when using an illumination mode that can be achieved by the illumination system of a known lithographic system (for example, having an illumination pupil fill of the order of 20%), the use of a specular diffraction grating can provide a better aberration measurement, at least for some aberrations (i.e. Zernike orders), than the use of a known diffusive grating.

Another advantage of the use of a specular diffraction grating at reticle level for aberration measurements is that such a specular diffraction grating can be more easily provided on a reticle. Although in principle a diffusive reflective grating could be formed on a reticle, in practice, such an arrangement would most likely not be practical and at present is not standard practice (and may not even be feasible). Therefore, at present, it is standard practice for the diffusive reflective grating to be provided elsewhere on a reticle stage such as on a fiducial or the like. However, if aberration measurements can be performed using a specular diffraction grating on the reticle, then a significant time saving can be made in the aberration measurements. For example, at present, after exposure of a target region of a substrate to radiation patterned by a reticle, in order to perform aberration measurements the reticle stage should be moved so that the fiducial (rather than the reticle) receives the EUV radiation from the illumination system. Furthermore, after such an aberration measurement, in order to expose of a target region of a substrate to radiation patterned by a reticle, the reticle stage should be moved so that the reticle (rather than the fiducial) receives the EUV radiation from the illumination system. However, if the specular diffraction grating that is used for the aberration measurements can be provided on the reticle then there will be a significant time saving since the reticle stage will not need to be moved as far in between exposure of a substrate and an aberration measurement. Furthermore, with the aberration measurements from the method according to the first aspect, lower order Zernike coefficients (such as, for example, $Z_2$, $Z_3$ and $Z_4$) may be used for reticle alignment. Advantageously, this may mean that additional sensors (again provided elsewhere on the reticle stage) may no longer need to be used for reticle alignment.

The method may comprise: performing a plurality of phase stepping or phase scanning processes, each of the plurality of phase stepping or phase scanning processes being performed using a different illumination mode such that different parts of the radiation detector receive radiation during different ones of the plurality of phase stepping or phase scanning processes but otherwise being similar to the other phase stepping or phase scanning processes; and the step of determining one or more aberrations of the projection system may comprise using the oscillating signals determined by each part of the radiation detector that receives radiation from any one of the plurality of phase stepping or phase scanning processes.

Advantageously, by performing a plurality of different phase-stepping or phase-scanning processes, each using a different illumination mode, each different phase-stepping or phase-scanning process can probe a different part of the projection system pupil plane. Note that the aberrations or aberration map are not determined for each individual phase-stepping or phase-scanning process and then combined. Rather, the aberrations or aberration map are determined using all of the plurality of phase-stepping or phase-scanning processes. Advantageously, such embodiments allow a higher-resolution measurement of the aberrations of the projection system.

The method may further comprise: performing an additional phase stepping or phase scanning process, the additional phase stepping or phase scanning process being performed using a diffusive diffraction grating as the first patterning device but otherwise being similar to the or each other phase stepping or phase scanning process: determining one or more additional aberrations of the projection system from the oscillating signals determined by each part of the radiation detector that receives radiation during the additional phase stepping or phase scanning process; and determining calibration data which characterizes any differences between: (a) the determined one or more aberrations of the projection system; and (b) the determined one or more additional aberrations of the projection system.

Such an arrangement may allow calibration data to be generated that can be used in subsequent measurements to correct additional aberrations of the projection system that are generated using a diffusive diffraction grating as the first patterning device. Advantageously, this can allow potentially significant errors in the measurement of some aberrations (for example the amplitude of some Zernike orders in an aberration map of the projection system) using such a diffusive diffraction grating as the first patterning device to be corrected away. This can allow subsequent aberration measurements to be made using a diffusive diffraction grating as the first patterning device which, advantageously, may make the subsequent aberration measurement(s) faster, potentially increasing throughput of the lithographic apparatus.

The method may further comprise storing the determined calibration data in memory.

According to a second aspect of the present disclosure, there is provided a calibration method, the method comprising: performing a phase stepping or phase scanning process using an object-level specular diffraction grating so as to generate one or more oscillating signals: determining one or more aberrations of the projection system from the one or more oscillating signals: performing an additional phase stepping or phase scanning process using an object-level diffusive diffraction grating so as to generate one or more additional oscillating signals: determining one or more additional aberrations of the projection system from the one or more additional oscillating signals; and determining calibration data which characterizes any differences between: (a) the determined one or more aberrations of the projection system; and (b) the determined one or more additional aberrations of the projection system.

Such an arrangement allows calibration data to be generated that can be used in subsequent measurements to correct additional aberrations of the projection system that are generated using a diffusive diffraction grating as the first patterning device. Advantageously, this can allow potentially significant errors in the measurement of some aberrations (for example the amplitude of some Zernike orders in an aberration map of the projection system) using such a diffusive diffraction grating as the first patterning device to be corrected away. This can allow subsequent aberration measurements to be made using a diffusive diffraction grating as the first patterning device which, advantageously, may make the subsequent aberration measurement(s) faster, potentially increasing throughput of the lithographic apparatus.

The method may further comprise: performing a subsequent phase stepping or phase scanning process, the subsequent phase stepping or phase scanning process being performed using the diffusive diffraction grating as the first patterning device but otherwise being similar to the or each other phase stepping or phase scanning process: determining one or more raw subsequent aberrations of the projection system from the oscillating signals determined by each part of the radiation detector that receives radiation during the subsequent phase stepping or phase scanning process; and determining one or more corrected subsequent aberrations from the one or more raw subsequent aberrations of the projection system and the calibration data.

The illumination radiation may comprise extreme ultraviolet radiation.

The first patterning device may be provided on a fiducial.

The first patterning device may be provided on a reticle.

Determination of any of the: one or more aberrations of the projection system; one or more additional aberrations of the projection system; or one or more raw subsequent aberrations of the projection system from the oscillating signals determined by each part of the radiation detector that receives radiation may comprise any known shearing interferometric techniques as desired or required. For example, determination of any of these aberrations may comprise any of the techniques disclosed in WO2019/149468, the contents of which is hereby incorporated by reference in its entirety. For the avoidance of doubt, determination of any of these aberrations may comprise any of the techniques disclosed in WO2019/149468 as prior art techniques and/or any techniques taught by WO2019/149468.

Any phase stepping or phase scanning processes may further comprise: illuminating the first patterning device with illumination radiation, wherein the first patterning device comprises a specular diffraction grating arranged to form a plurality of first diffraction beams, the first diffraction beams being separated in a second shearing direction: projecting, with the projection system, at least part of the plurality of first diffraction beams onto the sensor apparatus; and moving at least one of the first and second patterning devices in the second shearing direction such that an intensity of radiation received by each part of the radiation detector that receives radiation varies as a function of the movement in the second shearing direction so as to form an oscillating signal.

For example, the first patterning device may comprise: a first portion arranged to shear the illumination radiation in the shearing direction; and a second portion arranged to shear the illumination radiation in the second shearing direction. During illumination of the first portion of the first patterning device, at least one of the first patterning device and the second patterning device is stepped in the shearing direction. This generates first phase-stepping data that, at least at first order, may be related to a gradient of the aberration map in the shearing direction. During illumination of the second portion of the first patterning device, at least one of the first patterning device and the second patterning device is stepped in the second shearing direction. This generates second phase-stepping data that, at least at first order, may be related to a gradient of the aberration map in the second shearing direction. The first and second phase-stepping data are combined to determine the one or more aberrations of the projection system. The first and second phase-stepping data may be combined to determine an aberration (or relative phase) map of the projection system.

Determination of any of the: one or more aberrations of the projection system; one or more additional aberrations of the projection system; or one or more raw subsequent aberrations of the projection system from the oscillating signals determined by each part of the radiation detector that receives radiation may comprise: equating a phase of a harmonic of the oscillating signal received by each part of the radiation detector that receives radiation to a sum of at least one difference in the aberration map between a pair of positions in a pupil plane of the projection system.

The harmonic of the oscillating signal may be the first harmonic of the oscillating signal.

According to a third aspect of the present disclosure, there is provided a computer readable medium carrying a computer program comprising computer readable instructions configured to cause a computer to carry out the method according to the first aspect of the present disclosure or the second aspect of the present disclosure.

According to a fourth aspect of the present disclosure, there is provided a computer apparatus comprising: a memory storing processor readable instructions, and a processor arranged to read and execute instructions stored in said memory, wherein said processor readable instructions comprise instructions arranged to control the computer to carry out the method according to the first aspect of the present disclosure or the second aspect of the present disclosure.

According to a fifth aspect of the present disclosure, there is provided a measurement system for determining one or more aberrations of a projection system, the measurement system comprising: a first patterning device wherein the first patterning device comprises a specular diffraction grating: a sensor apparatus comprising a second patterning device and a radiation detector, the first patterning device and the sensor apparatus being positionable such that the projection system can form an image of the first patterning device on the second patterning device with illumination radiation and such that the radiation detector is arranged to receive the illumination radiation after it has passed through the second patterning device: a positioning apparatus configured to move at least one of the first patterning device and the sensor apparatus; and a controller configured to: control the positioning apparatus so as to move at least one of the first patterning device and the sensor apparatus in a shearing direction such that an intensity of radiation received by each part of the radiation detector varies as a function of the movement in the shearing direction so as to form an oscillating signal: determine from the radiation detector a phase of a harmonic of the oscillating signal at a plurality of positions on the radiation detector; and determine at least one coefficient that characterizes at least one aberration of the projection system from the phase of a harmonic of the oscillating signal at the plurality of positions on the radiation detector.

The measurement system according to the fifth aspect may be suitable for use within a lithographic apparatus. The first patterning device may be disposed at reticle level (i.e. in an object plane of the lithographic apparatus) and the sensor apparatus may be disposed at wafer level (i.e. in an image plane of the lithographic apparatus). In particular, the measurement system according to the fifth aspect may be suitable for use within an extreme ultraviolet (EUV) lithographic apparatus. That is, the illumination radiation may comprise EUV radiation.

It will be appreciated that the measurement system is of the form of a shearing interferometer.

The controller may be configured to carry out the method according to the first aspect of the present disclosure or the second aspect of the present disclosure.

The system may further comprise an illumination system operable to illuminate the first patterning device with illumination radiation.

The illumination radiation may comprise extreme ultraviolet radiation.

The first patterning device may be provided on a fiducial.

The first patterning device may be provided on a reticle.

According to a sixth aspect of the present disclosure, there is provided a lithographic apparatus comprising the measurement system according to the fifth aspect of the present disclosure.

BRIEF DESCRIPTION OF THE DRAWINGS

Embodiments of the invention will now be described, by way of example only, with reference to the accompanying schematic drawings, in which.

DETAILED DESCRIPTION

Figure 1:
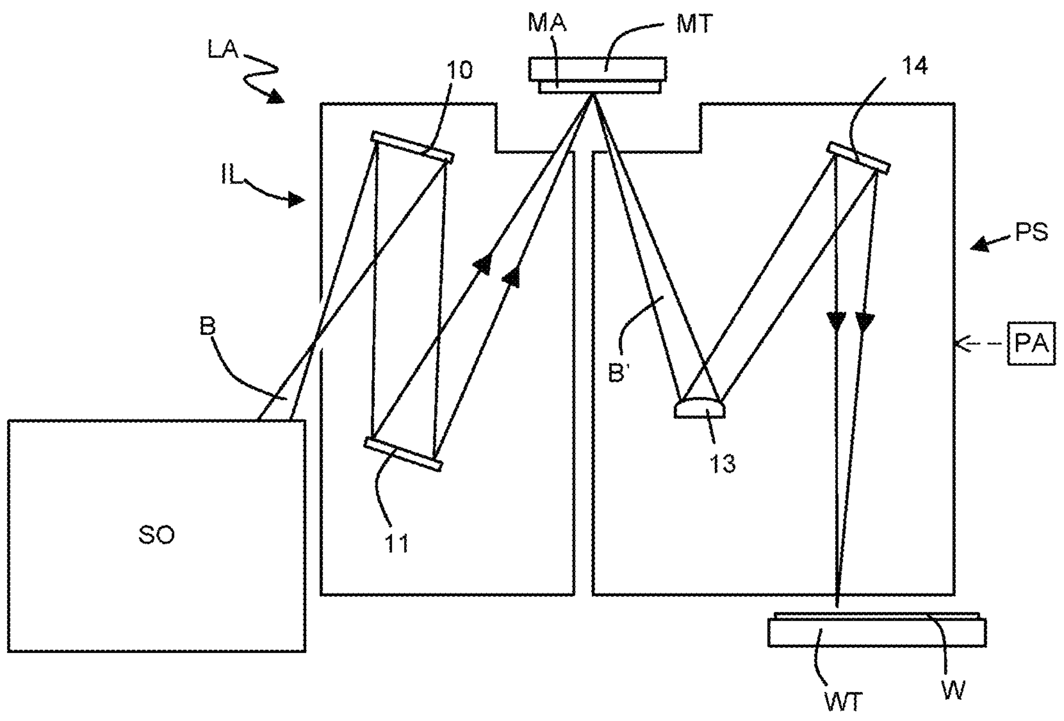
FIG. 1 depicts a lithographic system comprising a lithographic apparatus and a radiation source.

FIG. 1 shows a lithographic system comprising a radiation source SO and a lithographic apparatus LA. The radiation source SO is configured to generate an EUV radiation beam B and to supply the EUV radiation beam B to the lithographic apparatus LA. The lithographic apparatus LA comprises an illumination system IL, a support structure MT configured to support a patterning device MA (e.g., a mask), a projection system PS and a substrate table WT configured to support a substrate W. The patterning device MA may alternatively be referred to herein as a reticle. The support structure MT may alternatively be referred to as a reticle stage. The substrate W may alternatively be referred to herein as a wafer. The substrate table WT may alternatively be referred to as a substrate stage or a wafer stage.

The illumination system IL is configured to condition the EUV radiation beam B before the EUV radiation beam B is incident upon the patterning device MA. Thereto, the illumination system IL may include a facetted field mirror device 10 and a facetted pupil mirror device 11. The faceted field mirror device 10 and faceted pupil mirror device 11 together provide the EUV radiation beam B with a desired cross-sectional shape and a desired intensity distribution. The illumination system IL may include other mirrors or devices in addition to, or instead of, the faceted field mirror device 10 and faceted pupil mirror device 11.

After being thus conditioned, the EUV radiation beam B interacts with the patterning device MA. As a result of this interaction a patterned EUV radiation beam B' is generated. The projection system PS is configured to project the patterned EUV radiation beam B' onto the substrate W. For that purpose, the projection system PS may comprise a plurality of mirrors 13, 14 which are configured to project the patterned EUV radiation beam B' onto the substrate W held by the substrate table WT. The projection system PS may apply a reduction factor to the patterned EUV radiation beam B' thus forming an image with features that are smaller than corresponding features on the patterning device MA. For example, a reduction factor of 4 or 8 may be applied. Although the projection system PS is illustrated as having only two mirrors 13, 14 in FIG. 1, the projection system PS may include a different number of mirrors (e.g. six or eight mirrors).

The substrate W may include previously formed patterns. Where this is the case, the lithographic apparatus LA aligns the image, formed by the patterned EUV radiation beam B', with a pattern previously formed on the substrate W.

A relative vacuum. i.e. a small amount of gas (e.g. hydrogen) at a pressure well below atmospheric pressure, may be provided in the radiation source SO, in the illumination system IL, and/or in the projection system PS.

The radiation source SO may be a laser produced plasma (LPP) source, a discharge produced plasma (DPP) source, a free electron laser (FEL) or any other radiation source that is capable of generating EUV radiation.

In general, the projection system PS has an optical transfer function which may be non-uniform, which can affect the pattern which is imaged on the substrate W. For unpolarized radiation such effects can be fairly well described by two scalar maps, which describe the transmission (apodization) and relative phase (aberration) of radiation exiting the projection system PS as a function of position in a pupil plane thereof. These scalar maps, which may be referred to as the transmission map and the relative phase map, may be expressed as a linear combination of a complete set of basis functions. A particularly convenient set is the Zernike polynomials, which form a set of orthogonal polynomials defined on a unit circle. A determination of each scalar map may involve determining the coefficients in such an expansion. Since the Zernike polynomials are orthogonal on the unit circle, the Zernike coefficients may be obtained from a measured scalar map by calculating the inner product of the measured scalar map with each Zernike polynomial in turn and dividing this by the square of the norm of that Zernike polynomial. In the following, unless stated otherwise, any reference to Zernike coefficients will be understood to mean the Zernike coefficients of a relative phase map (also referred to herein as an aberration map). It will be appreciated that in alternative embodiments other sets of basis functions may be used. For example some embodiments may use Tatian Zernike polynomials, for example for obscured aperture systems.

The wavefront aberration map represents the distortions of the wavefront of light approaching a point in an image plane of the projection system PS from a spherical wavefront (as a function of position in the pupil plane or, alternatively, the angle at which radiation approaches the image plane of the projection system PS). As discussed, this wavefront aberration map W(x, y) may be expressed as a linear combination of Zernike polynomials:

$$W(x, y) = \sum_n Z_n \cdot z_n(x, y) \tag{1}$$

where x and y are coordinates in the pupil plane, $z_n(x, y)$ is the nth Zernike polynomial and $Z_n$ is a coefficient. It will be appreciated that in the following. Zernike polynomials and coefficients are labelled with an index which is commonly referred to as a Noll index. Therefore, $z_n(x, y)$ is the Zernike polynomial having a Noll index of n and $Z_n$ is a coefficient having a Noll index of n. The wavefront aberration map may then be characterized by the set of coefficients $Z_n$ in such an expansion, which may be referred to as Zernike coefficients.

It will be appreciated that only a finite number of Zernike orders are taken into account. Different Zernike coefficients of the phase map may provide information about different forms of aberration which are caused by the projection system PS. The Zernike coefficient having a Noll index of 1 may be referred to as the first Zernike coefficient, the Zernike coefficient having a Noll index of 2 may be referred to as the second Zernike coefficient and so on.

The first Zernike coefficient $Z_1$ relates to a mean value (which may be referred to as a piston) of a measured wavefront. The first Zernike coefficient may be irrelevant to the performance of the projection system PS and as such may not be determined using the methods described herein. The second Zernike coefficient $Z_2$ relates to the tilt of a measured wavefront in the x-direction. The tilt of a wavefront in the x-direction is equivalent to a placement in the x-direction. The third Zernike coefficient $Z_3$ relates to the tilt of a measured wavefront in the y-direction. The tilt of a wavefront in the y-direction is equivalent to a placement in the y-direction. The fourth Zernike coefficient $Z_4$ relates to a defocus of a measured wavefront. The fourth Zernike coefficient is equivalent to a placement in the z-direction. Higher order Zernike coefficients relate to other forms of aberration which are caused by the projection system (e.g. astigmatism, coma, spherical aberrations and other effects).

Throughout this description the term "aberrations" should be intended to include all forms of deviation of a wavefront from a perfect spherical wavefront. That is, the term "aberrations" may relate to the placement of an image (e.g. the second, third and fourth Zernike coefficients) and/or to higher order aberrations such as those which relate to Zernike coefficients having a Noll index of 5 or more. Furthermore, any reference to an aberration map for a projection system may include all forms of deviation of a wavefront from a perfect spherical wavefront, including those due to image placement.

The transmission map and the relative phase map are field and system dependent. That is, in general, each projection system PS will have a different Zernike expansion for each field point (i.e. for each spatial location in its image plane).

As will be described in further detail below, the relative phase of the projection system PS in its pupil plane may be determined by projecting radiation from an object plane of the projection system PS (i.e. the plane of the patterning device MA), through the projection system PS and using a shearing interferometer to measure a wavefront (i.e. a locus of points with the same phase). The shearing interferometer may comprise a diffraction grating, for example a two dimensional diffraction grating, in an image plane of the projection system (i.e. the substrate table WT) and a detector arranged to detect an interference pattern in a plane that is conjugate to a pupil plane of the projection system PS.

The projection system PS comprises a plurality of optical elements (including mirrors 13, 14). As already explained, although the projection system PS is illustrated as having only two mirrors 13, 14 in FIG. 1, the projection system PS may include a different number of mirrors (e.g. six or eight mirrors). The lithographic apparatus LA further comprises adjusting means PA for adjusting these optical elements so as to correct for aberrations (any type of phase variation across the pupil plane throughout the field). To achieve this, the adjusting means PA may be operable to manipulate optical elements within the projection system PS in one or more different ways. The projection system may have a co-ordinate system wherein its optical axis extends in the z direction (it will be appreciated that the direction of this z axis changes along the optical path through the projection system, for example at each mirror or optical element). The adjusting means PA may be operable to do any combination of the following: displace one or more optical elements: tilt one or more optical elements; and/or deform one or more optical elements. Displacement of optical elements may be in any direction (x, y, z or a combination thereof). Tilting of optical elements is typically out of a plane perpendicular to the optical axis, by rotating about axes in the x or y directions although a rotation about the z axis may be used for non-rotationally symmetric optical elements. Deformation of an optical element may be performed for example by using actuators to exert force on sides of the optical element and/or by using heating elements to heat selected regions of the optical element. In general, it may not be possible to adjust the projection system PS to correct for apodizations (transmission variation across the pupil plane). The transmission map of a projection system PS may be used when designing masks MAs for the lithographic apparatus LA.

In some embodiments, the adjusting means PA may be operable to move the support structure MT and/or the substrate table WT. The adjusting means PA may be operable to displace (in any of the x, y, z directions or a combination thereof) and/or tilt (by rotating about axes in the x or y directions) the support structure MT and/or the substrate table WT.

A projection system PS which forms part of a lithographic apparatus may periodically undergo a calibration process. For example, when a lithographic apparatus is manufactured in a factory the optical elements (e.g. mirrors) which form the projection system PS may be set up by performing an initial calibration process. After installation of a lithographic apparatus at a site at which the lithographic apparatus is to be used, the projection system PS may once again be calibrated. Further calibrations of the projection system PS may be performed at regular intervals. For example, under normal use the projections system PS may be calibrated every few months (e.g. every three months).

Calibrating a projection system PS may comprise passing radiation through the projection system PS and measuring the resultant projected radiation. Measurements of the projected radiation may be used to determine aberrations in the projected radiation which are caused by the projection system PS. Aberrations which are caused by the projection system PS may be determined using a measurement system. In response to the determined aberrations, the optical elements which form the projection system PS may be adjusted so as to correct for the aberrations which are caused by the projection system PS.

Figure 2:
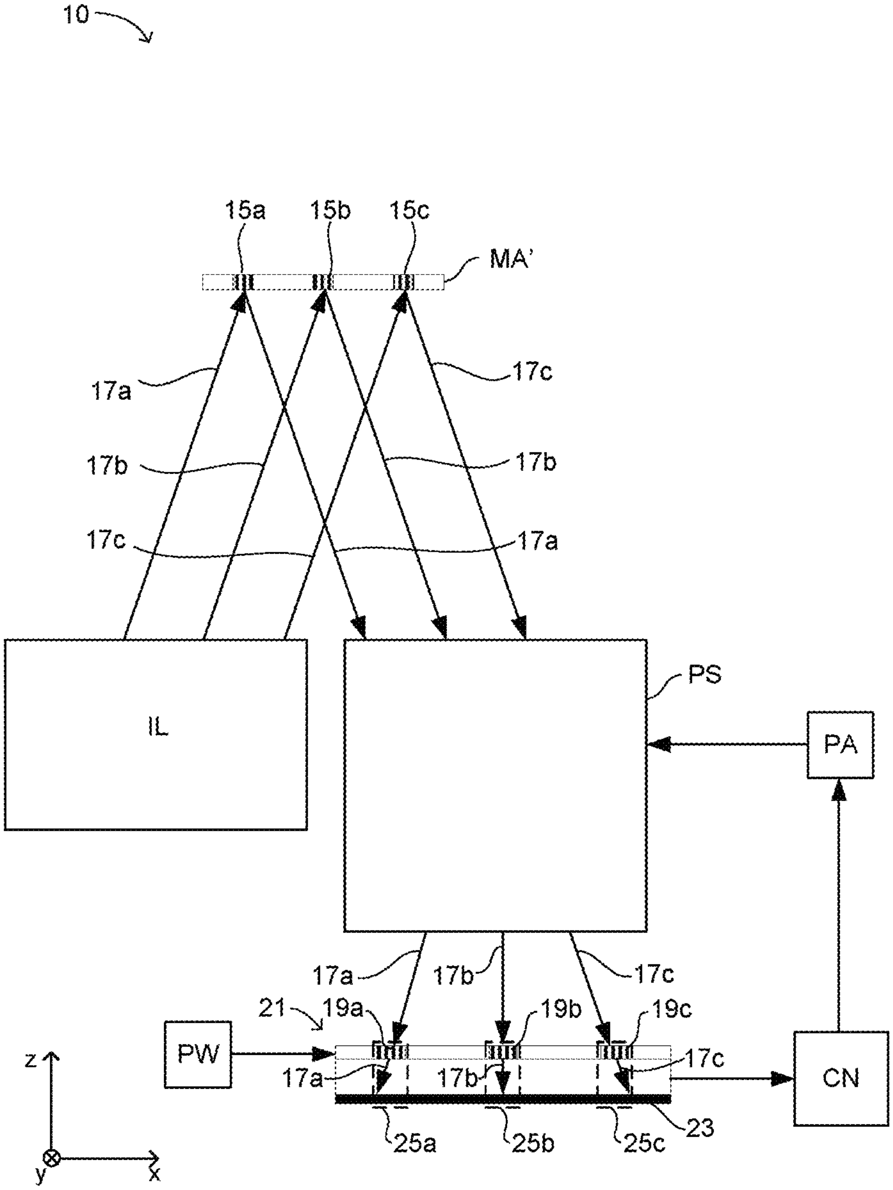
FIG. 2 is a schematic illustration of a measurement system according to an embodiment of the invention.

FIG. 2 is a schematic illustration of a measurement system 10 which may be used to determine aberrations which are caused by a projection system PS. The measurement system 10 comprises an illumination system IL, a measurement patterning device MA', a sensor apparatus 21 and a controller CN. The measurement system 10 may form part of a lithographic apparatus. For example, the illumination system IL and the projection system PS which are shown in FIG. 2 may be the illumination system IL and projection system PS of the lithographic apparatus which is shown in FIG. 1. For case of illustration additional components of a lithographic apparatus are not shown in FIG. 2.

The measurement patterning device MA' is arranged to receive radiation from the illumination system IL. The sensor apparatus 21 is arranged to receive radiation from the projection system PS. During normal use of a lithographic apparatus, the measurement patterning device MA' and the sensor apparatus 21 which are shown in FIG. 2 may be located in positions that are different to the positions in which they are shown in FIG. 2. For example, during normal use of a lithographic apparatus a patterning device MA which is configured to form a pattern to be transferred to a substrate W may be positioned to receive radiation from the illumination system IL and a substrate W may be positioned to receive radiation from the projection system PS (as is shown, for example, in FIG. 1).

The measurement patterning device MA' and the sensor apparatus 21 may be moved into the positions in which they are shown in FIG. 2 in order to determine aberrations which are caused by the projection system PS. The measurement patterning device MA' may be supported by a support structure MT, such as the support structure which is shown in FIG. 1. The sensor apparatus 21 may be supported by a substrate table, such as the substrate table WT which is shown in FIG. 1. Alternatively the sensor apparatus 21 may be supported by a measurement table (not shown) which may be separate to the sensor table WT.

Figure 3A:
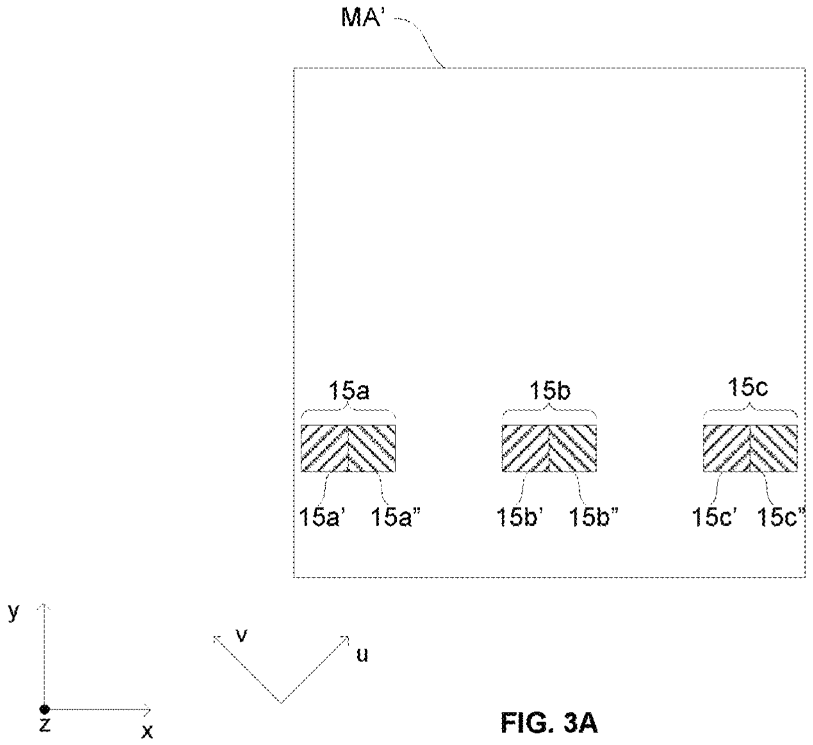
FIGS. 3A and 3B are schematic illustrations of a patterning device and a sensor apparatus which may form part of the measurement system of FIG. 2.
Figure 3B:
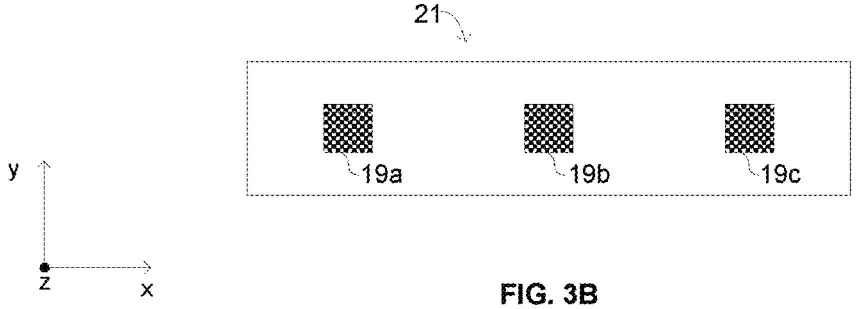

The measurement patterning device MA' and the sensor apparatus 21 are shown in more detail in FIGS. 3A and 3B. Cartesian co-ordinates are used consistently in FIGS. 2, 3A and 3B. FIG. 3A is a schematic illustration of the measurement patterning device MA' in an x-y plane and FIG. 3B is a schematic illustration of the sensor apparatus 21 in an x-y plane.

The measurement patterning device MA' comprises a plurality of patterned regions 15*a*-15*c*. In the embodiment which is shown in FIGS. 2 and 3A the measurement patterning device MA' is a reflective patterning device MA'. The patterned regions 15*a*-15*c* each comprises a reflective diffraction grating. Radiation which is incident on the patterned regions 15*a*-15*c* of the measurement patterning device MA' is at least partially scattered thereby and received by the projection system PS. In contrast, radiation which is incident on the remainder of the measurement patterning device MA 'is not reflected or scattered towards the projection system PS (for example, it may be absorbed by the measurement patterning device MA').

The illumination system IL illuminates the measurement patterning device MA' with radiation. Whilst not shown in FIG. 2, the illumination system IL may receive radiation from a radiation source SO and condition the radiation so as to illuminate the measurement patterning device MA'. For example, the illumination system IL may condition the radiation so as to provide radiation having a desired spatial and angular distribution. In the embodiment which is shown in FIG. 2, the illumination system IL is configured to form separate measurement beams 17*a*-17*c*. Each measurement beam 17*a*-17*c* illuminates a respective patterned region 15*a*-15*c* of the measurement patterning device MA.

In order to perform a determination of aberrations which are caused by the projection system PL, a mode of the illumination system IL may be changed in order to illuminate the measurement patterning device MA' with separate measurement beams 17*a*-17*c*. For example, during normal operation of a lithographic apparatus, the illumination system IL may be configured to illuminate a patterning device MA with a slit of radiation. However the mode of the illumination system IL may be changed such that the illumination system IL is configured to form separate measurement beams 17*a*-17*c* in order to perform a determination of aberrations caused by the projection system PL. In some embodiments different patterned regions 15*a*-15*c* may be illuminated at different times. For example, a first subset of the patterned regions 15*a*-15*c* may be illuminated at a first time so as to form a first subset of measurement beams 17*a*-17*c* and a second subset of patterned regions 15*a*-15*c* may be illuminated at a second time so as to form a second subset of measurement beams 17*a*-17*c*.

In other embodiments the mode of the illumination system IL may be unchanged in order to perform a determination of aberrations caused by the projection system PL. For example, the illumination system IL may be configured to illuminate the measurement patterning device MA' with a slit of radiation (e.g. which substantially corresponds with an illumination area used during exposure of substrates). Separate measurement beams 17*a*-17*c* may then be formed by the measurement patterning device MA' since only the patterned regions 15*a*-15*c* reflect or scatter radiation towards the projection system PS.

In the Figures the Cartesian co-ordinate system is shown as being conserved through the projection system PS. However, in some embodiments the properties of the projection system PS may lead to a transformation of the co-ordinate system. For example, the projection system PS may form an image of the measurement patterning device MA' which is magnified, rotated and/or mirrored relative to the measurement patterning device MA'. In some embodiments the projection system PS may rotate an image of the measurement patterning device MA' by approximately 180° around the z-axis. In such an embodiment the relative positions of a first measurement beam 17*a* and a third measurement beam 17*c* which are shown in FIG. 2, may be swapped. In other embodiments the image may be mirrored about an axis which may lie in an x-y plane. For example, the image may be mirrored about the x-axis or about the y-axis.

In embodiments in which the projection system PS rotates an image of the measurement patterning device MA' and/or the image is mirrored by the projection system PS, the projection system is considered to transform the co-ordinate system. That is, the co-ordinate system which is referred to herein is defined relative to an image which is projected by the projection system PS and any rotation and/or mirroring of the image causes a corresponding rotation and/or mirroring of the co-ordinate system. For case of illustration, the co-ordinate system is shown in the Figures as being conserved by the projection system PS. However, in some embodiments the co-ordinate system may be transformed by the projection system PS.

The patterned regions 15*a*-15*c* modify the measurement beams 17*a*-17*c*. In particular, the patterned regions 15*a*-15*c* cause a spatial modulation of the measurement beams 17*a*-17*c* and cause diffraction in the measurement beams 17*a*-17*c*. In the embodiment which is shown in FIG. 3B the patterned regions 15*a*-15*c* each comprise two distinct portions. For example, a first patterned region 15*a* comprises a first portion 15*a*' and a second portion 15*a*". The first portion 15*a*' comprises a diffraction grating which is aligned parallel to a u-direction and the second portion 15*a*" comprises a diffraction grating which is aligned parallel to a v-direction. The u and v-directions are depicted in FIG. 3A. The u and v-directions are both aligned at approximately 45° relative to both the x and y-directions and are aligned perpendicular to each other. Second 15*b* and third 15*c* patterned regions which are shown in FIG. 3A are identical to the first patterned region 15*a* and each comprise first and second portions whose diffraction gratings are aligned perpendicular to each other.

The first and second portions of the patterned regions 15*a*-15*c* may be illuminated with the measurement beams 17*a*-17*c* at different times. For example, the first portions of each of the patterned regions 15*a*-15*c* may be illuminated by the measurement beams 17*a*-17*c* at a first time. At a second time the second portions of each of the patterned regions 15*a*-15*c* may be illuminated by the measurement beams 17*a*-17*c*. As was mentioned above in some embodiments different patterned regions 15*a*-15*c* may be illuminated at different times. For example, the first portions of a first subset of patterned regions 15*a*-15*c* may be illuminated at a first time and the first portions of a second subset of patterned regions 15*a*-15*c* may be illuminated at a second time. Second portions of the first and second subsets of patterned regions may be illuminated at the same or different times. In general any schedule of illuminating different portions of patterned regions 15*a*-15*c* may be used.

The modified measurement beams 17*a*-17*c* are received by the projection system PS. The projection system PS forms an image of the patterned regions 15*a*-15*c* on the sensor apparatus 21. The sensor apparatus 21 comprises a plurality of diffraction gratings 19*a*-19*c* and a radiation detector 23. The diffraction gratings 19*a*-19*c* are arranged such that each diffraction grating 19*a*-19*c* receives a respective modified measurement beam 17*a*-17*c* which is output from the projection system PL. The projection system PS is arranged to form an image of each of the patterned regions 15*a*-15*c* on a respective one of diffraction the gratings 19*a*-19*c* of the sensor apparatus 21. The modified measurement beams 17*a*-17*c* which are incident on the diffraction gratings 19*a*-19*c* are further modified by the diffraction gratings 19*a*-19*c*. The modified measurement beams which are transmitted at the diffraction gratings 19*a*-19*c* are incident on the radiation detector 23.

The radiation detector 23 is configured to detect the spatial intensity profile of radiation which is incident on the radiation detector 23. The radiation detector 23 may, for example, comprise an array of individual detector elements or sensing elements. For example, the radiation detector 23 may comprise an active pixel sensor such as, for example, a CMOS (complementary metal-oxide-semiconductor) sensor array. Alternatively, the radiation detector 23 may comprise a CCD (charge-coupled device) sensor array. The diffraction gratings 19*a*-19*c* and portions of the radiation sensor 23 at which the modified measurement beams 17*a*-17*c* are received form detector regions 25*a*-25*c*. For example, a first diffraction grating 19*a* and a first portion of the radiation sensor 23 at which a first measurement beam 17*a* is received together form a first detector region 25*a*. A measurement of a given measurement beam 17*a*-17*c* may be made at a respective detector region 25*a*-25*c* (as depicted). As was described above, in some embodiments the relative positioning of the modified measurement beams 17$a$-17$c$ and the co-ordinate system may be transformed by the projection system PS.

The modification of the measurement beams 17$a$-17$c$ which occurs at the patterned regions 15$a$-15$c$ and the diffraction gratings 19$a$-19$c$ of the detector regions 25$a$-25$c$ results in interference patterns being formed on the radiation detector 23. The interference patterns are related to the derivative of the phase of the measurement beams and depend on aberrations caused by the projection system PS. The interference patterns may therefore be used to determine aberrations which are caused by the projection system PS.

In general, the diffraction gratings 19$a$-19$c$ of each of the detector regions 25$a$-25$c$ comprises a two-dimensional transmissive diffraction grating. In the embodiment which is shown in FIG. 3B the detector regions 25$a$-25$c$ each comprise a diffraction grating 19$a$-19$c$ which is configured in the form of a checkerboard. In alternative embodiments, the detector regions 25$a$-25$c$ may each comprise a two-dimensional transmissive diffraction grating 19$a$-19$c$ that is not configured in the form of a checkerboard but may instead be, for example, a pinhole array.

Illumination of the first portions of the patterned regions 15$a$-15$c$ may provide information related to a gradient of an aberration map of the projection system PS in a first direction and illumination of the second portions of the patterned regions 15$a$-15$c$ may provide information related to a gradient of the aberration map of the projection system PS in a second direction.

In some embodiments, the measurement patterning device MA' and/or the sensor apparatus 21 is sequentially scanned and/or stepped in two perpendicular directions. For example, the measurement patterning device MA' and/or the sensor apparatus 21 may be stepped relative to each other in the u and v-directions. The measurement patterning device MA' and/or the sensor apparatus 21 may be stepped in the u-direction whilst the second portions 15$a$"-15$c$" of the patterned regions 15$a$-15$c$ are illuminated and the measurement patterning device MA' and/or the sensor apparatus 21 may be stepped in the v-direction whilst the first portions 15$a$-15$c$' of the patterned regions 15$a$-15$c$ are illuminated. That is, the measurement patterning device MA' and/or the sensor apparatus 21 may be stepped in a direction which is perpendicular to the alignment of a diffraction grating which is being illuminated.

The measurement patterning device MA' and/or the sensor apparatus 21 may be stepped by distances which correspond with a fraction of the grating period of the diffraction gratings. Measurements which are made at different stepping positions may be analysed in order to derive information about a wavefront in the stepping direction. For example, the phase of the first harmonic of the measured signal (which may be referred to as a phase stepping signal) may contain information about the derivative of a wavefront in the stepping direction (i.e. a gradient of the wavefront map in the stepping direction). Stepping the measurement patterning device MA' and/or the sensor apparatus 21 in both the u and v-directions (which are perpendicular to each other) therefore allows information about a wavefront to be derived in two perpendicular directions (in particular, it provides information about a derivative of the wavefront in each of the two perpendicular directions), thereby allowing the full wavefront to be reconstructed.

In addition to stepping of the measurement patterning device MA' and/or the sensor apparatus 21 in a direction which is perpendicular to the alignment of a diffraction grating which is being illuminated (as was described above), the measurement patterning device MA' and/or the sensor apparatus 21 may also be scanned relative to each other. Scanning of the measurement patterning device MA' and/or the sensor apparatus 21 may be performed in a direction which is parallel to the lines of a diffraction grating which is being illuminated. For example, the measurement patterning device MA' and/or the sensor apparatus 21 may be scanned in the u-direction whilst the first portions 15$a$-15$c$' of the patterned regions 15$a$-15$c$ are illuminated and the measurement patterning device MA' and/or the sensor apparatus 21 may be scanned in the v-direction whilst the second portions 15$a$"-15$c$" of the patterned regions 15$a$-15$c$ are illuminated. Scanning of the measurement patterning device MA' and/or the sensor apparatus 21 in a direction which is parallel to the alignment of a diffraction grating which is being illuminated allows measurements to be averaged out across the diffraction grating, thereby accounting for any variations in the diffraction grating in the scanning direction. Scanning of the measurement patterning device MA' and/or the sensor apparatus 21 may be performed at a different time to the stepping of the measurement patterning device MA' and/or the sensor apparatus 21 which was described above.

It will be appreciated that a variety of different arrangements of the patterned regions 15$a$-15$c$ and the detector regions 25$a$-25$c$ may be used in order to determine aberrations caused by the projection system PS. The patterned regions 15$a$-15$c$ and/or the detector regions 25$a$-25$c$ may comprise diffraction gratings. In some embodiments the patterned regions 15$a$-15$c$ and/or the detector regions 25$a$-25$c$ may comprise components other than a diffraction grating. For example, in some embodiments the patterned regions 15$a$-15$c$ and/or the detector regions may comprise a single slit or a pin-hole opening through which at least a portion of a measurement beam 17$a$-17$c$ may propagate. In general the patterned regions and/or the detector regions may comprise any arrangement which serves to modify the measurement beams.

The controller CN receives measurements made at the sensor apparatus 21 and determines, from the measurements, aberrations which are caused by the projection system PS. The controller may be configured to control one or more components of the measurement system 10. For example, the controller CN may control a positioning apparatus PW which is operable to move the sensor apparatus 21 and/or the measurement patterning device MA' relative to each other. The controller may control an adjusting means PA for adjusting components of the projection system PS. For example, the adjusting means PA may adjust optical elements of the projection system PS so as to correct for aberrations which are caused by the projection system PS and which are determined by the controller CN.

In some embodiments, the controller CN may be operable to control the adjusting means PA for adjusting the support structure MT and/or the substrate table WT. For example, the adjusting means PA may adjust support structure MT and/or substrate table WT so as to correct for aberrations which are caused by placement errors of patterning device MA and/or substrate W (and which are determined by the controller CN).

Determining aberrations (which may be caused by the projection system PS or by placement errors of the patterning device MA or the substrate W) may comprise fitting the measurements which are made by the sensor apparatus 21 to Zernike polynomials in order to obtain Zernike coefficients. Different Zernike coefficients may provide information about different forms of aberration which are caused by the projection system PS. Zernike coefficients may be determined independently at different positions in the x and/or the y-directions. For example, in the embodiment which is shown in FIGS. 2, 3A and 3B. Zernike coefficients may be determined for each measurement beam 17*a*-17*c*.

In some embodiments the measurement patterning device MA' may comprise more than three patterned regions, the sensor apparatus 21 may comprise more than three detector regions and more than three measurement beams may be formed. This may allow the Zernike coefficients to be determined at more positions. In some embodiments the patterned regions and the detector regions may be distributed at different positions in both the x and y-directions. This may allow the Zernike coefficients to be determined at positions which are separated in both the x and the y-directions.

Whilst, in the embodiment which is shown in FIGS. 2, 3A and 3B the measurement patterning device MA' comprises three patterned regions 15*a*-15*c* and the sensor apparatus 21 comprises three detector regions 25*a*-25*c*, in other embodiments the measurement patterning device MA' may comprise more or less than three patterned regions 15*a*-15*c* and/or the sensor apparatus 21 may comprise more or less than three detector regions 25*a*-25*c*.

Any methods known in the art may be used for determining aberrations caused by a projection system PS. Examples of such methods are disclosed in WO2019/149468 and WO2019/149468, both of which are hereby incorporated herein in their entirety by reference. Methods for determining aberrations caused by a projection system PS are now briefly described with reference to FIG. 4.

In general, measurement patterning device MA' comprises at least one first patterned region 15*a*-15*c* and the sensor apparatus 21 comprises at least one second patterned region 19*a*-19*c*.

Figure 4:
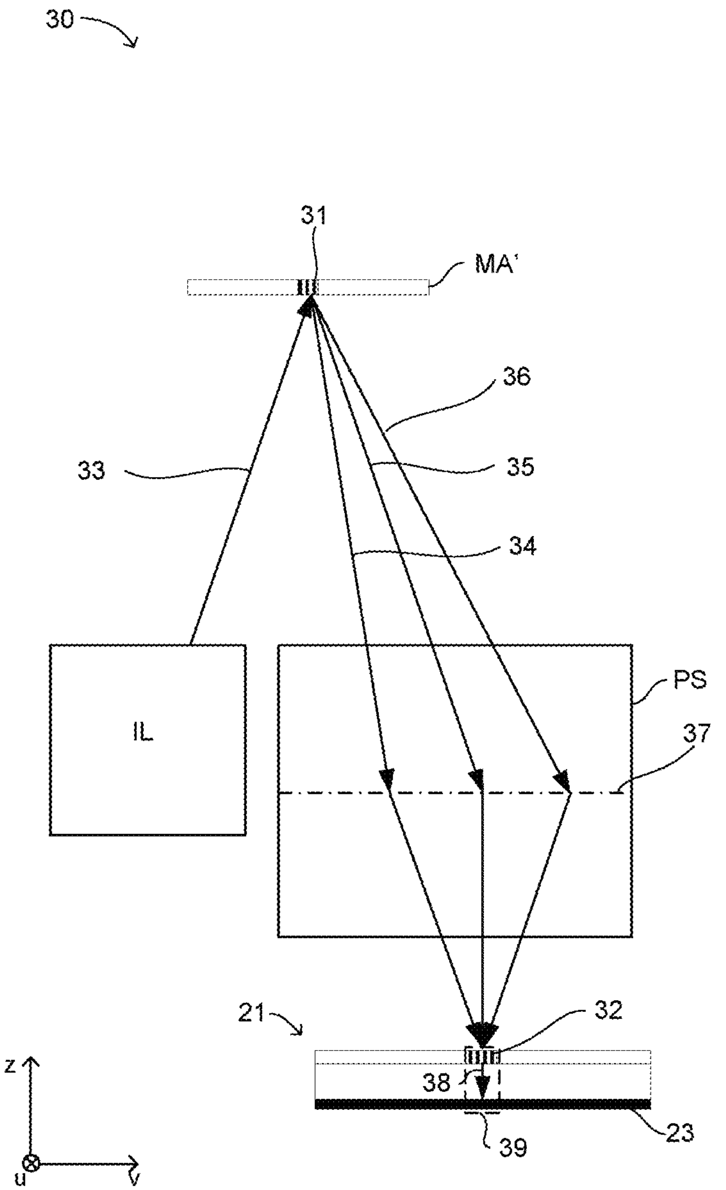
FIG. 4 is a schematic illustration of a measurement system according to an embodiment of the invention, the measurement system comprising a first patterned region and a second patterned region, the first patterned region arranged to receive radiation and to form a plurality of first diffraction beams.

FIG. 4 is a schematic illustration of a measurement system 30 which may be used to determine aberrations which are caused by a projection system PS. Measurement system 30 may be the same as the measurement system 10 shown in FIG. 2, however, it may have a different number of first patterned regions (on measurement patterning device MA') and second patterned regions (in the sensor apparatus 21). Therefore, the measurement system 30 shown in FIG. 4 may include any features of the measurement system 10 shown in FIG. 2 described above and these features will not be further described below.

In FIG. 4, only a single first patterned region 31 is provided on the measurement patterning device MA' and a single second patterned region 32 is provided in the sensor apparatus 21.

The measurement patterning device MA' is irradiated with radiation 33 from the illumination system IL. For ease of understanding only a single line (which may, for example, represent a single ray, for example the chief ray, of an incident radiation beam) is shown in FIG. 4. However, it will be appreciated that the radiation 33 will comprise a range of angles incident on the first patterned region 31 of the measurement patterning device MA'. That is, each point on the first patterned region 31 of the measurement patterning device MA' may be illuminated by a cone of light (which cone, as explained further below, is, in general, not fully filled with light). In general, each point is illuminated by substantially the same range of angles, this being characterized by the intensity of radiation in a pupil plane of the illumination system IL (not shown).

The first patterned region 31 is arranged to receive the radiation 33 and to form a plurality of first diffraction beams 34, 35, 36. A central first diffraction beam 35 corresponds to a $0^{th}$ order diffraction beam of first patterned region 31 and the other two first diffraction beams 34, 36 correspond to the $\pm 1^{st}$ order diffraction beams of first patterned region 31. It will be appreciated that more, higher order diffraction beams will, in general, also be present. Again for case of understanding, only three first diffraction beams 34, 35, 36 are shown in FIG. 4.

It will also be appreciated that, as the incoming radiation 33 comprises a (partially-filled) cone of radiation converging on a point on the first patterned region 31, each of the first diffraction beams 34, 35, 36 also comprises a (partially-filled) cone of radiation diverging from that point on the first patterned region 31.

To achieve the generation of the first diffraction beams 34, 35, 36, the first patterned region 31 may be of the form of a diffraction grating. For example, the first patterned region 31 may be generally of the form of the patterned region 15*a* shown in FIG. 3A. In particular, at least a portion of the first patterned region 31 may be of the form of the first portion 15*a*' of the patterned region 15*a* shown in FIG. 3A. i.e. a diffraction grating which is aligned parallel to a u-direction (note that FIG. 4 is shown in the z-v plane). Therefore, the first diffraction beams 34-36 are separated in a shearing direction, which is the v-direction.

The first diffraction beams 34-36 are at least partially captured by the projection system PS, as now described. How much of the first diffraction beams 34-36 is captured by the projection system PS will be dependent on: the pupil fill of the incident radiation 33 from the illumination system IL: the angular separation of the first diffraction beams 34-36 (which in turn is dependent on the pitch of the first patterned region 31 and the wavelength of the radiation 33); and the numerical aperture of the projection system PS.

In general, substantially all of the first diffraction beam 35 that corresponds to the $0^{th}$ order diffraction beam and most of the first diffraction beams 34, 36 that correspond to the $\pm 1^{st}$ order diffraction beams is captured by the projection system PS and projected onto the sensor apparatus 21. (Furthermore, with such an arrangement a large number of diffraction beams generated by the first patterned region 31 are at least partially projected onto the sensor apparatus 21).

The role of the first patterned region 31 is to introduce spatial coherence, as now discussed.

In general, two rays of radiation 33 from the illumination system IL that are incident on the same point of the measurement patterning device MA' at different angles of incidence are not coherent. By receiving the radiation 33 and forming a plurality of first diffraction beams 34, 35, 36, the first patterned region 31 may be considered to form a plurality of copies of the incident radiation cone 33 (the copies having, in general, different phases and intensities). Within any one of these copies, or first diffraction beams 34, 35, 36, two rays of radiation which originate from the same point on the measurement patterning device MA' but at different scattering angles, are not coherent (due to the properties of the illumination system IL). However, for a given ray of radiation within any one of the first diffraction beams 34, 35, 36 there is a corresponding ray of radiation in each of the other first diffraction beams 34, 35, 36 that is spatially coherent with that given ray. For example, the chief rays of each of the first diffraction beams 34, 35, 36 (which correspond to the chief ray of the incident radiation 33) are coherent and could, if combined, interfere at the amplitude level.

This coherence is exploited by the measurement system 30 to determine an aberration map of the projection system PS.

The projection system PS projects part of the first diffraction beams 34, 35, 36 (which is captured by the numerical aperture of the projection system) onto the sensor apparatus 21.

In FIG. 4, the sensor apparatus 21 comprises the single second patterning region 32. As described further below (with reference to FIGS. 5A-5C), second patterned region 32 is arranged to receive these first diffraction beams 34-36 from the projection system PS and to form a plurality of second diffraction beams from each of the first diffraction beams. In order to achieve this, the second patterning region 32 comprises a two-dimensional transmissive diffraction grating. In FIG. 4, all radiation that is transmitted by the second patterning region 32 is represented as a single arrow 38. This radiation 38 is received by a detector region 39 of the radiation detector 23 and is used to determine the aberration map.

Each of the first diffraction beams 34-36 that is incident on the patterning region 32 will diffract to from a plurality of second diffraction beams. Since the second patterning region 32 comprises a two-dimensional diffraction grating, from each incident first diffraction beam, a two dimensional array of secondary diffraction beams is produced (the chief rays of these secondary diffraction beams being separated in both the shearing direction (v-direction) and the direction perpendicular thereto (the u-direction)). In the following, a diffraction order that is $n^{th}$ order in the shearing direction (the v-direction) and $m^{th}$ order in the non-shearing direction (the u-direction) will be referred to as the $(n, m)^{th}$ diffraction order of the second patterned region 32. In the following, where it is not important what order a second diffraction beam is in the non-shearing direction (the u-direction), the $(n, m)^{th}$ diffraction order of the second patterned region 32 may be referred to simply as the $n^{th}$ order second diffraction beam.

Figure 5A:
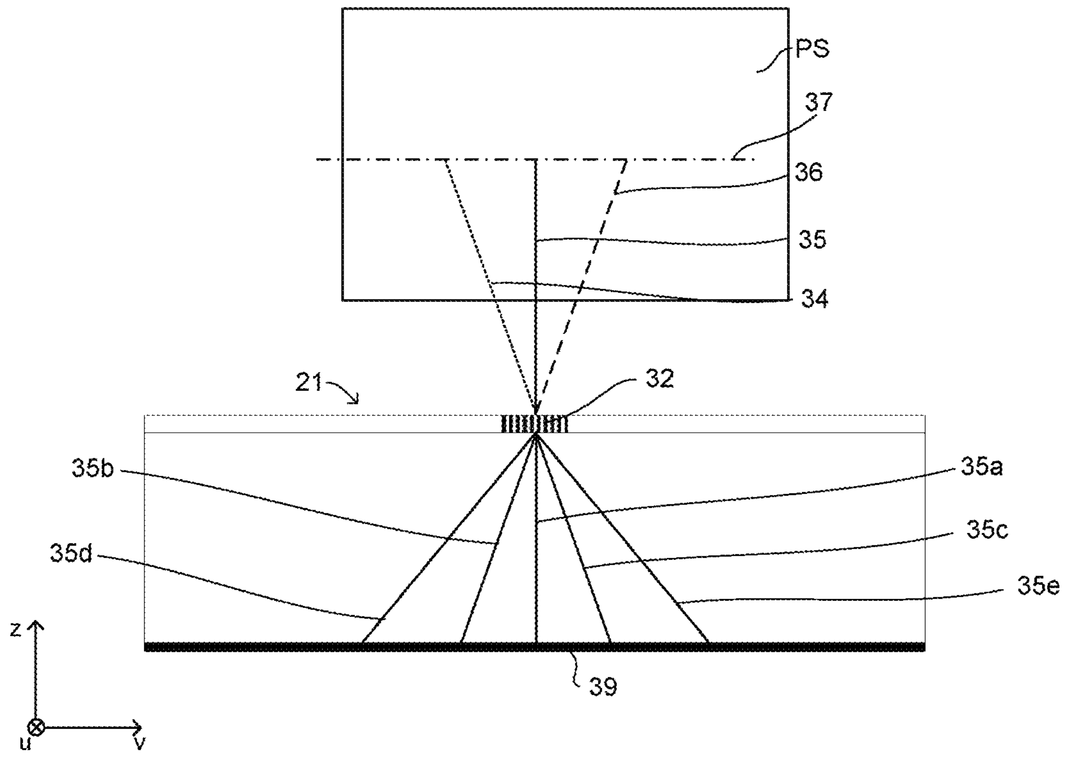
FIGS. 5A to 5C each shows a different set of second diffraction beams formed by the second patterned region of the measurement system shown in FIG. 4, that set of second diffraction beams having been produced by a different first diffraction beam formed by the first patterned region.
Figure 5B:
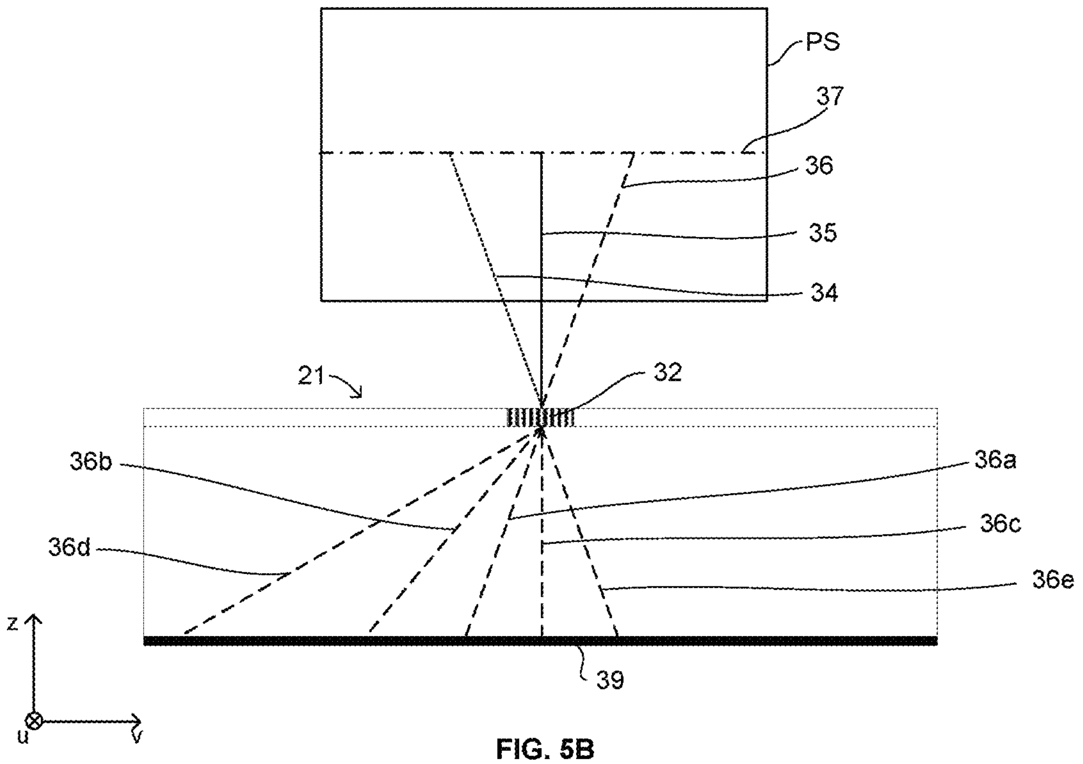
Figure 5C:
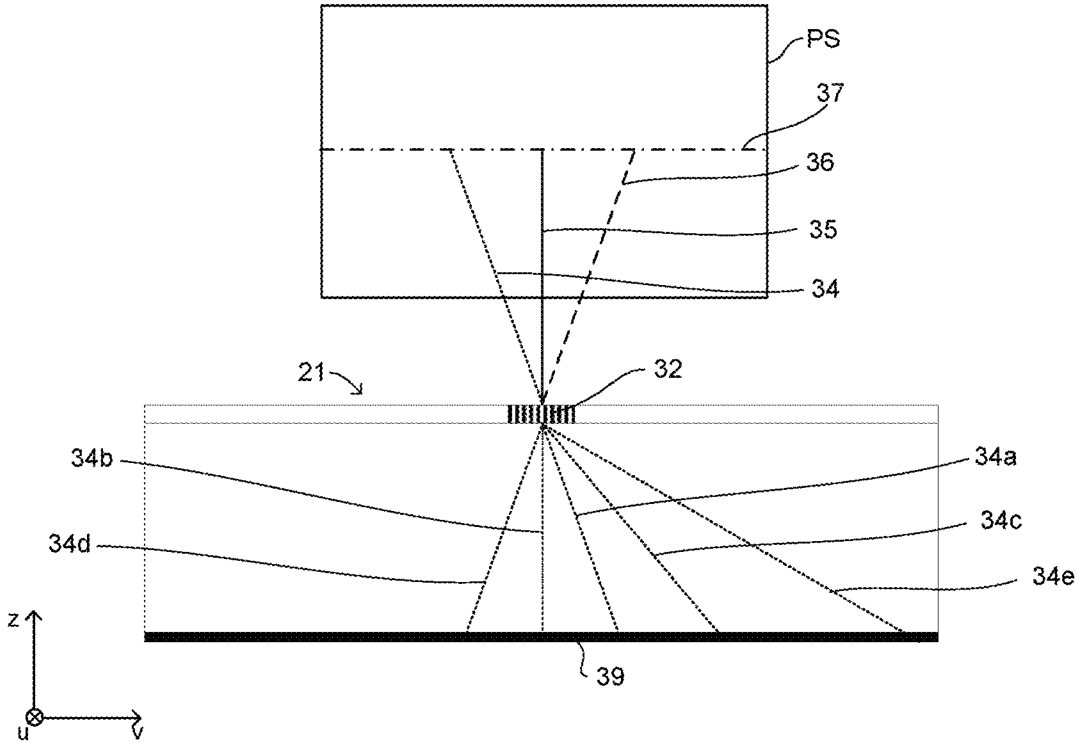

FIGS. 5A to 5C show a set of second diffraction beams produced by each of the first diffraction beams 34-36. FIG. 5A shows a set of second diffraction beams 35*a*-35*e* produced by the first diffraction beam 35 that corresponds to the $0^{th}$ order diffraction beam of first patterned region 31. FIG. 5B shows a set of second diffraction beams 36*a*-36*e* produced by the first diffraction beam 36 that corresponds to the $-1^{st}$ order diffraction beam of first patterned region 31. FIG. 5C shows a set of second diffraction beams 34*a*-34*c* produced by the first diffraction beam 34 that corresponds to the $+1^{st}$ order diffraction beam of first patterned region 31.

In FIG. 5A, second diffraction beam 35*a* corresponds to the $0^{th}$ order diffraction beam (of second patterned region 32, and in the shearing direction), whereas second diffraction beams 35*b*. 35*c* correspond to the $\pm 1^{st}$ order diffraction beams and second diffraction beams 35*d*. 35*e* correspond to the $\pm 2^{nd}$ order diffraction beams. It will be appreciated that FIGS. 5A-5C are shown in the v-z plane and the shown second diffraction beams may, for example, correspond to $0^{th}$ order diffraction beam of second patterned region 32 in the non-shearing direction (i.e. the u-direction). It will be further appreciated that there will be a plurality of copies of these second diffraction beams, representing higher order diffraction beams in the non-shearing direction that are into or out of the page of FIGS. 5A-5C.

In FIG. 5B, second diffraction beam 36*a* corresponds to the $0^{th}$ order diffraction beam (of second patterned region 32, and in the shearing direction), whereas second diffraction beams 36*b*. 36*c* correspond to the $\pm 1^{st}$ order diffraction beams and second diffraction beams 36*d*. 36*e* correspond to the $\pm 2^{nd}$ order diffraction beams.

In FIG. 5C, second diffraction beam 34*a* corresponds to the $0^{th}$ order diffraction beam (of second patterned region 32, and in the shearing direction), whereas second diffraction beams 34*b*, 34*c* correspond to the $\pm 1^{st}$ order diffraction beams and second diffraction beams 34*d*. 34*c* correspond to the $\pm 2^{nd}$ order diffraction beams.

It can be seen from FIGS. 5A-5C that several of the second diffraction beams spatially overlap with each other. For example, the second diffraction beam 35*b* that corresponds to the $-1^{st}$ order diffraction beam of second patterned region 32, which originates from the $0^{th}$ order diffraction beam 35 of first patterned region 31 overlaps with the second diffraction beam 36*a* that corresponds to the 0th order diffraction beam of second patterned region 32, which originates from the $-1^{st}$ order diffraction beam 36 of first patterned region 31. All of the lines in FIGS. 4 and 5A-5C may be considered to represent a single ray of radiation that originates from a single input ray 33 from the illumination system IL. Therefore, as explained above, these lines represent spatially coherent rays that, if spatially overlapping at radiation detector 23 will produce an interference pattern. Furthermore, the interference is between rays which have passed though different parts of the pupil plane 37 of the projection system PS (which are separated in the shearing direction). Therefore, the interference of radiation that originates from a single input ray 33 is dependent on phase differences between two different parts of the pupil plane.

This spatial overlapping and spatial coherence of the second diffraction beams at radiation detector 23 is achieved by matching the first and second patterned regions 31, 32 such that the angular separation (in the shearing direction) between different second diffraction beams that originate from a given first diffraction beam is the same as the angular separation (in the shearing direction) between different first diffraction beams as they converge on the second patterned region 32. This spatial overlapping and spatial coherence of the second diffraction beams at radiation detector 23 is achieved by matching the pitches of the first and second patterned regions 31, 32 in the shearing direction. It will be appreciated that this matching of the pitches of the first and second patterned regions 31, 32 in the shearing direction takes into account any reduction factor applied by the projection system PS. As used herein, the pitch of a two dimensional diffraction grating in a particular direction is defined as follows.

It will be appreciated that a one-dimensional diffraction grating comprises a series of lines that are formed from a repeating pattern (of reflectivity or transmissivity) in a direction perpendicular to these lines. In the direction perpendicular to the lines, the smallest non-repeating section from which the repeating pattern is formed is referred to as the unit cell and the length of this unit cell is referred to as the pitch of the one-dimensional diffraction grating. In general, such a one-dimensional diffraction grating will have a diffraction pattern such that an incident radiation beam will be diffracted so as to form a one-dimensional array of angularly spaced (but potentially spatially overlapping) diffraction beams. The first patterned region 31 forms such a one-dimensional array of angularly spaced first diffraction beams 34-36, which are offset (angularly spaced) in the shearing direction.

It will be appreciated that a two-dimensional diffraction grating comprises a two-dimensional repeating pattern of reflectivity or transmissivity. The smallest non-repeating section from which this repeating pattern is formed may be referred to as the unit cell. The unit cell may be square and a fundamental pitch of such a two-dimensional diffraction grating may be defined as a length of the square unit cell. In general, such a two dimensional diffraction grating will have a diffraction pattern such that an incident radiation beam will be diffracted so as to form a two dimensional array of angularly spaced (but potentially spatially overlapping) diffraction beams. The axes of this two-dimensional (square) array of diffraction beams are parallel to the sides of the unit cell. The angular separation between adjacent diffraction beams in these two directions may be given by the ratio of the wavelength of the radiation to the pitch of the grating. Therefore, the smaller the pitch, the larger the angular separation between the adjacent diffraction beams.

In some embodiments, the axes of the unit cell of the two-dimensional second patterned region 32 may be arranged at a non-zero angle to the shearing and non-shearing directions as defined by the first patterned region 31. For example, the axes of the unit cell of the two-dimensional second patterned region 32 may be arranged at 45° to the shearing and non-shearing directions as defined by the first patterned region 31. As previously explained, spatial overlapping and spatial coherence of the second diffraction beams at radiation detector 23 which allows the wavefront to be measured is achieved by ensuring that that the angular separation (in the shearing direction) between different second diffraction beams that originate from a given first diffraction beam is the same as the angular separation (in the shearing direction) between different first diffraction beams as they converge on the second patterned region 32. For an arrangement wherein the axes of the unit cell of the two-dimensional second patterned region 32 are arranged at a non-zero angle (for example) 45° to the shearing and non-shearing directions, it can be useful to define a pseudo-unit cell and a pseudo-pitch as follows. The pseudo-unit cell is defined as the smallest non-repeating square from which the repeating pattern of the diffraction grating is formed, which is orientated such that its sides are parallel to the shearing and non-shearing directions (as defined by the first patterned region 31. The pseudo-pitch may be defined as a length of the square pseudo-unit cell. This may be referred to as the pitch of a two dimensional diffraction grating in the shearing direction. It is this pseudo-pitch which should be matched to (an integer multiple or fraction of) the pitch of the first patterned region 31.

The diffraction pattern of the diffraction grating may be considered to form a two dimensional array of angularly spaced (but potentially spatially overlapping) pseudo-diffraction beams, the axes of this two-dimensional (square) array of pseudo-diffraction beams being parallel to the sides of the pseudo-unit cell. Since this square is not the unit cell (defined as to the smallest square of any orientation from which the repeating pattern of the diffraction grating is formed), the pseudo-pitch will be larger than the pitch (or fundamental pitch). Therefore, there will a smaller separation between adjacent pseudo-diffraction beams in the diffraction pattern (in a direction parallel to the sides of the pseudo-unit cell) than there is between adjacent diffraction beams in the diffraction pattern (in a direction parallel to the sides of the unit cell). This can understood as follows. Some of the pseudo-diffraction beams correspond to diffraction beams in the diffraction pattern and the other pseudo-diffraction beams are unphysical and do not represent a diffraction beam generated by the diffraction grating (and only arise due to the use of a pseudo-unit cell that is larger than the true unit cell).

Taking any reduction (or enlargement) factor applied by the projection system PS into account, either the pitch of the second patterned region 32 in the shearing direction should be an integer multiple of the pitch of the first patterned region 31 in the shearing direction or the pitch of the first patterned region 31 in the shearing direction should be an integer multiple of the pitch of the second patterned region 32 in the shearing direction. In the example shown in FIGS. 5A-5C, the pitches of the first and second patterned regions 31, 32 in the shearing direction are substantially equal (taking into account any reduction factor).

As can be seen from FIGS. 5A-5C, each point on the detector region 39 of the radiation detector 23 will, in general, receive several contributions that are summed coherently. For example, the point on the detector region 39 which receives the second diffraction beam 35*b* that corresponds to the $-1^{st}$ order diffraction beam of second patterned region 32, which originates from the $0^{th}$ order diffraction beam 35 of first patterned region 31 overlaps with both: (a) the second diffraction beam 36*a* that corresponds to the $0^{th}$ order diffraction beam of second patterned region 32, which originates from the $-1^{st}$ order diffraction beam 36 of first patterned region 31; and (b) the second diffraction beam 34*d* that corresponds to the $-2^{nd}$ order diffraction beam of second patterned region 32, which originates from the $+1^{st}$ order diffraction beam 34 of first patterned region 31. It will be appreciated that when higher order diffraction beams of the first patterned region 31 are taken into account there will be more beams that should be summed coherently at each point on the detector region 39 in order to determine the intensity of radiation as measured by that part of the detector region 39 (for example a corresponding pixel in a two dimensional array of sensing elements).

In general, a plurality of different second diffraction beams contributes to the radiation received by each part of the detector region 39. The intensity of radiation from such a coherent sum is given by:

$$I = DC + \sum_{pairs(i)} \gamma_i \cos(\Delta\phi_i), \tag{2}$$

where DC is a constant term (which is equivalent to the incoherent sum of the different diffraction beams), the sum is over all pairs of different second diffraction beams. $\gamma_i$ is an interference strength for that pair of second diffraction beams and $\Delta\phi_i$ is a phase difference between that pair of second diffraction beams.

The phase difference $\Delta\phi_i$ between a pair of second diffraction beams is dependent on two contributions: (a) a first contribution relates to the different part of the pupil plane 37 of the projection system PS from which they originate; and (b) a second contribution relates to the position within the unit cells of each of the first and second patterned regions 31, 32 from which they originate.

The first of these contributions can be understood to arise from the fact that the different coherent radiation beams have passed through different parts of the projection system PS and are therefore related to the aberrations that it is desired to determine (in fact they are related to a difference between two points in the aberration map that are separated in the shearing direction).

The second of these contributions can be understood to arise from the fact that the relative phases of multiple rays of radiation that arise from a single ray incident on a diffraction grating will depend on which part of the unit cell of that grating the ray was incident. This therefore does not contain information relating to the aberrations. As explained above, in some embodiments, the measurement patterning device MA' and/or the sensor apparatus 21 are sequentially scanned and/or stepped in the shearing direction. This causes the phase differences between all of pairs of interfering radiation beams received by the radiation detector 23 to change. As the measurement patterning device MA' and/or the sensor apparatus 21 are sequentially stepped in the shearing direction by an amount that is equivalent to a fraction of the pitches (in the shearing direction) of the first and second patterned regions 31, 32, in general, the phase differences between pairs of second diffraction beams will all change. If the measurement patterning device MA' and/or the sensor apparatus 21 are stepped in the shearing direction by an amount that is equivalent to an integer multiple of the pitches (in the shearing direction) of the first and second patterned regions 31, 32 the phase differences between pairs of second diffraction beams will remain the same. Therefore, as the measurement patterning device MA' and/or the sensor apparatus 21 are by sequentially scanned and/or stepped in the shearing direction, the intensity received by each part of the radiation detector 23 will oscillate. The first harmonic of this oscillating signal (which may be referred to as a phase-stepping signal), as measured by the radiation detector 23, is dependent on the contributions to equation (1) that arise from adjacent first diffraction beams 34-36. i.e. first diffraction beams that differ in order by ±1. Contributions that arise from first diffraction beams that differ in order by a different amount will contribute to higher order harmonics of the signal determined by the radiation detector 23 due to such phase stepping techniques.

For example, of the three overlapping second diffraction beams discussed above (35*b*. 36*a* and 34*d*) only two of the three possible pairs of these diffraction beams will contribute to the first harmonic of the phase stepping signal: (a) second diffraction beams 35*b* and 36*a* (which originate from the $0^{th}$ order diffraction beam 35 and the $-1^{st}$ order diffraction beam 36 of first patterned region 31 respectively); and (b) second diffraction beams 35*a* and 34*d* (which originate from the $0^{th}$ order diffraction beam 35 and the $+1^{st}$ order diffraction beam 34 of first patterned region 31 respectively).

Each pair of second diffraction beams will result in an interference term of the form shown in equation (2), which contributes to the first harmonic of the phase stepping signal. i.e. an interference term of the form:

$$\gamma\cos\left(\frac{2\pi}{p}\cdot v+\Delta W\right) \tag{3}$$

where γ is an amplitude of the interference term, p is the pitch of the first and second patterned regions 31, 32 (in the shearing direction), v parameterizes the relative positions of the first and second patterned regions 31, 32 in the shearing direction and ΔW is a difference between the value of the aberration map at two positions in the pupil plane of the projection system PS, the two positions corresponding to the positions from which the two second diffraction beams originate. The amplitude γ of the interference term is proportional to the product of the compound scattering efficiencies of the two second diffraction beams, as discussed for example in WO2019/149468. The frequency of the first harmonic of the phase stepping signal is given by the inverse of the pitch p of the first and second patterned regions 31, 32 in the shearing direction. The phase of the phase stepping signal is given by ΔW (the difference between the values of the aberration map at two positions in the pupil plane of the projection system PS, the two positions corresponding to the positions from which the two second diffraction beams originate).

In the above description of the embodiments shown in FIGS. 3A to 5C, where the first portion 15*a*' of the patterned region 15*a* shown in FIG. 3A is illuminated, the shearing direction corresponds to the v-direction and the non-shearing direction corresponds to the u-direction. It will be appreciated that when the second portion 15*a*" of the patterned region 15*a* shown in FIG. 3A is illuminated, the shearing direction corresponds to the u-direction and the non-shearing direction corresponds to the v-direction. Although in these above-described embodiments, the u and v-directions (which define the two shearing directions) are both aligned at approximately 45° relative to both the x and y-directions of the lithographic apparatus LA, it will be appreciated that in alternative embodiments the two shearing directions may be arranged at any angle to the x and y-directions of the lithographic apparatus LA (which may correspond to non-scanning and scanning directions of the lithographic apparatus LA). In general, the two shearing directions will be perpendicular to each other.

As explained in WO2019/149468, or using more traditional techniques, the wavefront may be reconstructed as follows. A first phase stepping process may be performed using a first shearing direction (the v-direction, using the first portion 15*a*' of the patterned region 15*a* shown in FIG. 3A) and the phase of the first harmonic of the oscillating phase-stepping signal is related to the term ΔW in equation (3). For the first phase stepping process, for each pixel or sensing element of the detector region 39 which receives the radiation 38, the term ΔW in equation (3) is related to a gradient of the wavefront in the first shearing direction (the v-direction). A second phase stepping process may be performed using a second shearing direction (the u-direction, using the second portion 15*a*" of the patterned region 15*a* shown in FIG. 3A) and the phase of the first harmonic of the oscillating phase-stepping signal is related to the term ΔW in equation (3). For the second phase stepping process, for each pixel or sensing element of the detector region 39 which receives the radiation 38, the term ΔW in equation (3) is related to a gradient of the wavefront in the second shearing direction (the u-direction). Therefore, two phases (of the harmonic of a phase-stepping signal) are determined for each pixel or sensing element of the detector region 39 which receives the radiation 38. These determined phases for all of the pixels of the detector region 39 are combined to determine the wavefront (relative-phase) map of the projection system PS.

Some embodiments of the present disclosure relate to a method of determining one or more aberrations of a projection system PS that uses a specular diffraction grating at reticle level or in an object plane of the projection system PS. Some other embodiments of the present disclosure relate to a corresponding measurement system for determining one or more aberrations of a projection system PS that uses a specular diffraction grating at reticle level or in an object plane of the projection system PS. The measurement system may be generally of the measurement systems shown in FIGS. 2 and 4 above and the specular diffraction grating at reticle level or in an object plane of the projection system PS may be used as any of the plurality of patterned regions 15*a*-15*c* shown in FIGS. 2 to 3A and as described above and/or as the first patterned region 31 shown in FIG. 4 and as described above.

It will be appreciated that a specular diffraction grating is intended to mean a reflective diffraction grating comprising a pattern of reflective portions and radiation absorbing portions wherein reflection from the reflective portions is predominantly specular or normal reflection. Put differently, a specular diffraction grating is intended to mean a reflective diffraction grating which causes minimal diffusion of radiation incident thereon. It will be appreciated that this may be achieved my ensuring that the reflective portions of the specular diffraction grating are sufficiently smooth. In particular, any imperfections or surface roughness of the reflective portions of the specular diffraction grating may be small compared to the wavelength of illumination radiation which the specular diffraction grating scatters in use.

Figure 6B:
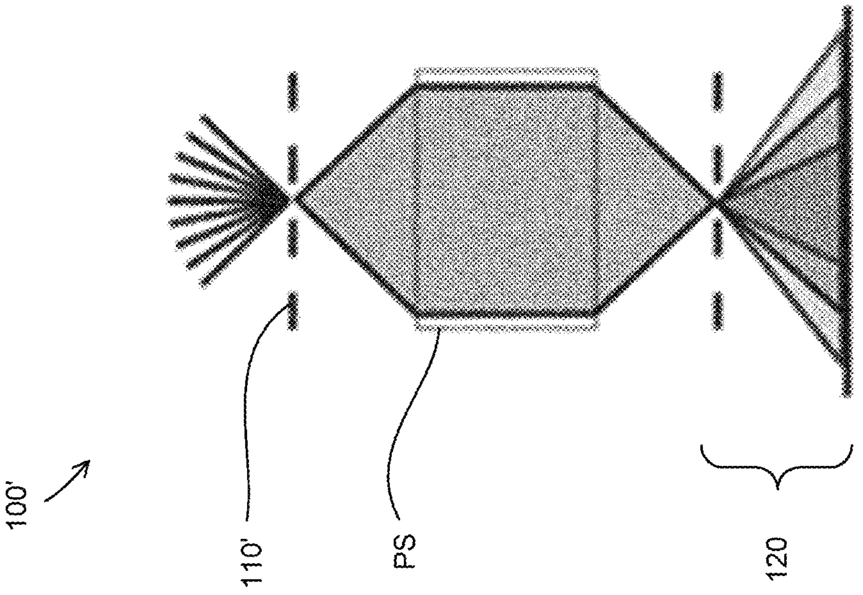
FIG. 6B shows a typical measurement system for aberrations of a projection system of known EUV lithographic apparatus that uses a diffusive reflective grating as a first patterning device (at reticle level)
Figure 6A:
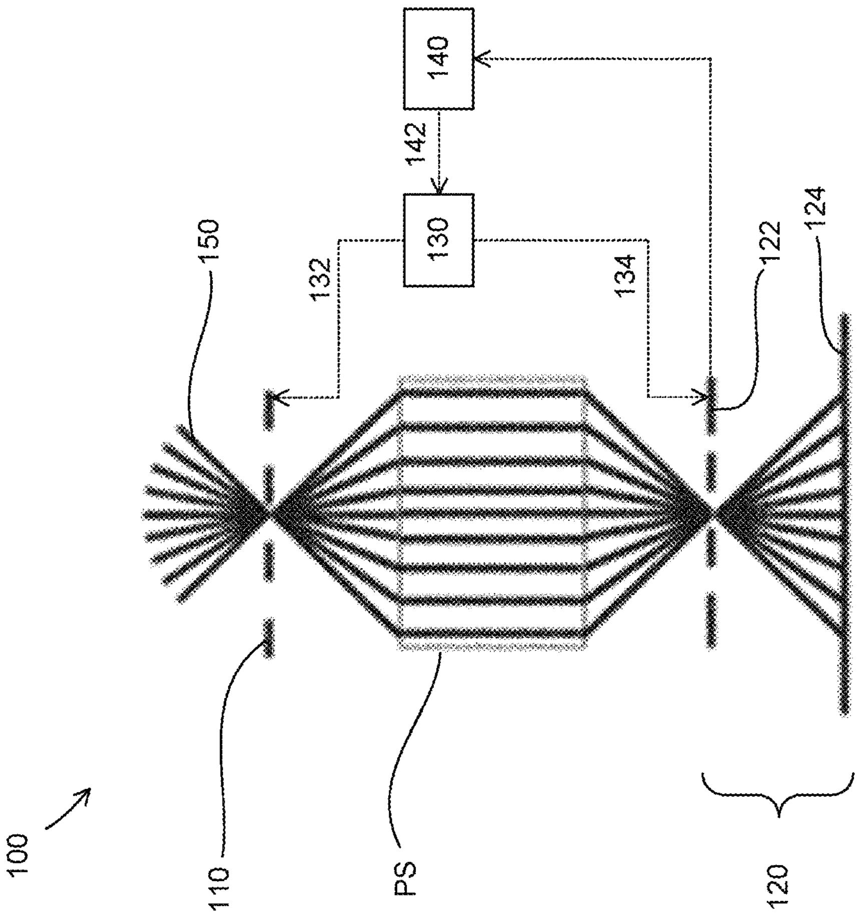
FIG. 6A is a schematic illustration of a new measurement system for determining one or more aberrations of a projection system (for example the projection system of the lithographic system shown in FIG. 1) wherein, merely for ease of illustration, the measurement system is illustrated as a linear arrangement with the optical axis remaining in a single direction (it will be appreciated that in practice the first patterning device and components within the projection system are reflective and that in practice the optical axis changes at each such reflection)

FIG. 6A is a schematic illustration of a new measurement system 100 for determining one or more aberrations of a projection system PS. The measurement system 100 comprises: a first patterning device 110: a sensor apparatus 120; a positioning apparatus 130; and a controller 140. Merely for case of illustration, the measurement system 100 is illustrated as a linear arrangement with the optical axis remaining in a single direction. It will be appreciated that in practice the first patterning device 110 and components within the projection system PS are reflective and that in practice the optical axis changes at each such reflection.

The positioning apparatus 130 is configured to move at least one of the first patterning device 110 and the sensor apparatus 120. To achieve this, the positioning apparatus 130 may be operable to send a control signal 132, 134 to one or both of the first patterning device 110 and the sensor apparatus 120.

The first patterning device 110 is positionable in an object plane of the projection system PS. During an aberration measurement, a phase stepping or phase scanning process may be performed during which the first patterning device is positioned in an object plane of the projection system PS (for example using the positioning apparatus 130). The first patterning device 110 comprises a specular diffraction grating.

The sensor apparatus 120 comprises: a second patterning device 122 and a radiation detector 124. The sensor apparatus 120 is provided at wafer level. The sensor apparatus 120 is positionable such that the second patterning device 122 can be disposed in an image plane of the projection system PS. The first patterning device 110 and the sensor apparatus 120 are positionable (for example using the positioning apparatus 130) such that the projection system PS can form an image of the first patterning device 110 on the second patterning device 122 with illumination radiation 150 and such that the radiation detector 124 is arranged to receive the illumination radiation 150 after it has passed through the second patterning device 122.

The controller 140 is configured to control the positioning apparatus 130 so as to move at least one of the first patterning device 110 and the sensor apparatus 120. In particular, the controller 140 may be configured during a phase stepping or phase scanning process so as to control the positioning apparatus 130 so as to move at least one of the first patterning device 110 and the sensor apparatus 120 in a shearing direction such that an intensity of radiation received by each part (for example each individual sensing element or pixel) of the radiation detector 124 varies as a function of the movement in the shearing direction so as to form an oscillating signal.

The controller 140 is further configured to determine from the radiation detector 124 a phase of a harmonic of the oscillating signal at a plurality of positions on the radiation detector 124 (for example each individual sensing element or pixel). The controller 140 is further configured to determine at least one coefficient that characterizes at least one aberration of the projection system PS from the phase of a harmonic of the oscillating signal at the plurality of positions on the radiation detector 124.

The measurement system 100 is suitable for use within an extreme ultraviolet (EUV) lithographic apparatus. That is, the illumination radiation 150 may comprise EUV radiation. It will be appreciated that the measurement system 100 is of the form of a shearing interferometer.

The measurement system 100 is suitable for use within a lithographic apparatus LA of the type shown in FIG. 1 and is generally equivalent to the measurement systems shown in FIGS. 2 and 4 and described above and may incorporate any of the features described above in relation to FIGS. 2 to 5B (as may any of the methods the controller 140 may be configured to carry out, which are described below with reference to FIGS. 7 to 12). The first patterning device 110 is generally equivalent to one of the plurality of patterned regions 15*a*-15*c* shown in FIGS. 2 to 3A and as described above and/or to the first patterned region 31 shown in FIG. 4 and as described above. The sensor apparatus 120 is generally equivalent to one of the detector regions 25*a*-25*c* shown in FIGS. 2 to 3A and as described above and/or the detector region 39 shown in FIGS. 4 to 5B and as described above.

In some embodiments, the measurement system 100 may further comprise an illumination system (not shown) operable to illuminate the first patterning device 110 with illumination radiation 150. Such an illumination system may comprise any of the illumination system IL and/or the radiation source SO shown in FIG. 1.

In some embodiments, the first patterning device 110 may be provided on a fiducial. In other embodiments, the first patterning device 110 may be provided on a reticle.

Various methods that the controller 140 is configured to carry out are now described with reference to FIGS. 7 to 12.

A new method 200 determining one or more aberrations of a projection system PS is now described with reference to FIG. 7. The method 200 shown in FIG. 7 may be implemented by the measurement system 100 shown in FIG. 6A. The method 200 is a form of shearing interferometry.

The method 200 comprises: a step 210 of performing a phase stepping or phase scanning process; and a step 220 of determining one or more aberrations of the projection system PS (from signals determined during the phase stepping or phase scanning process).

The phase stepping or phase scanning process comprises a step 212 of illuminating a first patterning device 110 with illumination radiation 150. The first patterning device 110 comprises a specular diffraction grating arranged to form a plurality of first diffraction beams from the illumination radiation 150, the first diffraction beams being separated in a shearing direction.

The phase stepping or phase scanning process further comprises a step 214 of projecting, with the projection system PS, at least part of the plurality of first diffraction beams onto a sensor apparatus 120. The sensor apparatus 120 comprises: a second patterning device 122; and a radiation detector 124. The second patterning device 122 is arranged to receive the first diffraction beams from the projection system PS and to form a plurality of second diffraction beams from each of the first diffraction beams. The radiation detector 124 is arranged to receive at least a portion of the second diffraction beams.

The phase stepping or phase scanning process further comprises a step 216 of moving at least one of the first and second patterning devices 110, 122 in the shearing direction such that an intensity of radiation received by each part of the radiation detector 124 that receives radiation varies as a function of the movement in the shearing direction so as to form an oscillating signal.

At step 220 the one or more aberrations of the projection system PS are determined from the oscillating signals determined by each part of the radiation detector 124 that receives radiation.

The method 200 is suitable for use within a lithographic apparatus LA. The first patterning device 110 may be disposed at reticle level (i.e. in an object plane of the lithographic apparatus LA) and the sensor apparatus 120 may be disposed at wafer level (for example the second patterning device 122 may be disposed in an image plane of the lithographic apparatus LA). In particular, the method 200 is suitable for use within an extreme ultraviolet (EUV) lithographic apparatus and the illumination radiation 150 may comprise EUV radiation.

During a lithographic process, radiation B is used to form a typically diffraction-limited image on a substrate W (such as, for example, a resist-coated wafer) using a projection system PS. In practice, the projection system PS will not form a perfect image but rather will be subject to some level of aberrations. Such aberrations represent distortions of the wavefront of light approaching a point in an image plane of the projection system PS from a spherical wavefront (and may, in general, be dependent on a position in the pupil plane or, alternatively, the angle at which radiation approaches the image plane of the projection system PS). It is desirable to minimise aberrations and therefore it is desirable to perform a measurement of the aberrations, which may be used as part of a feedback loop to minimise aberrations as far as possible.

The measurement of aberrations of the projection system of known EUV lithographic apparatus typically uses the same (EUV) radiation B for the aberration measurements as is used for exposure of wafers during the lithography process. This is clearly advantageous as it is the aberrations caused when imaging with the EUV radiation B that it is desirable to measure and minimise (as these affect the image formed on the wafers). However, the radiation B is provided to the reticle level of the lithography apparatus via an illumination system IL that is arranged to optimize the angular distribution of the EUV radiation at reticle level for lithographic imaging performance. In particular, although known EUV lithographic apparatus allow for the angular distribution of the EUV radiation at reticle level (which may be referred to as the illumination mode) to be controlled to an extent (for example using the field facet mirror 10 and pupil facet mirror 11 shown in FIG. 1) it does not allow for uniform pupil fill illumination (i.e. illumination of each field point at reticle level with a uniform cone of radiation). The illumination modes achievable by the illumination system IL would not probe the full pupil plane of the projection system PS.

As a result, the measurement of aberrations of the projection system of known EUV lithographic apparatus typically uses a diffusive reflective grating as a first patterning device (at reticle level). A typical measurement system 100' for aberrations of the projection system of known EUV lithographic apparatus that uses a diffusive reflective grating 110' as a first patterning device (at reticle level) is shown schematically in FIG. 6B. Again, merely for case of illustration, the measurement system 100' is illustrated as a linear arrangement with the optical axis remaining in a single direction. The diffusive reflective grating 110' is arranged to fill the entire pupil plane of the projection system PS so that the whole of the projection system PS is probed during the aberration measurement. This is illustrated in FIG. 6B with the radiation propagating from the diffusive reflective grating 110' to the projection system PS being represented by a solid cone. This is in contrast to the specular diffraction grating 110 which scatters radiation into discrete portions of the pupil plane of the projection system PS.

However, the inventor of the present invention has realized that such a diffusive reflective diffraction grating 110' can introduce significant errors in the measurement of some aberrations (for example the amplitude of some Zernike orders in an aberration map of the projection system PS). Typically, a diffusive reflective grating 110' for an aberration measurement system 100' is formed by forming a rough surface to which a reflective grating pattern is applied. For example, a uniform reflective layer may be applied to the rough surface and a pattern of radiation absorbing portions is formed over the reflective layer. However, the inventor of the present invention has realized that the aberration measurements performed using the diffusive reflective diffraction grating 110' are dependent on the specific rough surface used to cause the diffusion.

However, despite the strong prejudice that exists in the art that diffusion should be used to fully probe the projection system PS, the inventor of the present invention has arrived at the surprising realization that measurements using a specular diffraction grating 110 can provide an improved aberration measurement, at least for some aberrations (i.e. Zernike orders). In particular, even when using an illumination mode that can be achieved by the illumination system IL of a known lithographic system LA, the use of a specular diffraction grating 110 can provide a better aberration measurement, at least for some aberrations (i.e. Zernike orders), than the use of a known diffusive grating 110'.

Another advantage of the use of a specular diffraction grating 110 at reticle level for aberration measurements is that such a specular diffraction grating 110 can be more easily provided on a reticle MA. Although in principle a diffusive reflective grating could be formed on a reticle MA, in practice, such an arrangement would most likely not be practical and at present is not standard practice (and may not even be feasible). Therefore, at present, it is standard practice for the diffusive reflective grating to be provided elsewhere on a reticle stage MT such as on a fiducial or the like. However, if aberration measurements can be performed using a specular diffraction grating 110 on the reticle MA, then a significant time saving can be made in the aberration measurements. For example, at present, after exposure of a target region of a substrate W to radiation patterned by a reticle MA, in order to perform aberration measurements the reticle stage MT should be moved so that the fiducial (rather than the reticle MA) receives the EUV radiation B from the illumination system IL. Furthermore, after such an aberration measurement, in order to expose of a target region of a substrate W to radiation patterned by a reticle MA, the reticle stage MT should be moved so that the reticle MA (rather than the fiducial) receives the EUV radiation B from the illumination system IL. However, if the specular diffraction grating 110 that is used for the aberration measurements can be provided on the reticle MA then there will be a significant time saving since the reticle stage MT will not need to be moved as far in between exposure of a substrate W and an aberration measurement. Furthermore, with the aberration measurements from the method 200 shown in FIG. 7, lower order Zernike coefficients (such as, for example, $Z_2$, $Z_3$ and $Z_4$) may be used for reticle MA alignment. Advantageously, this may mean that additional sensors (again provided elsewhere on the reticle stage MT) may no longer need to be used for reticle MA alignment.

Figure 7:
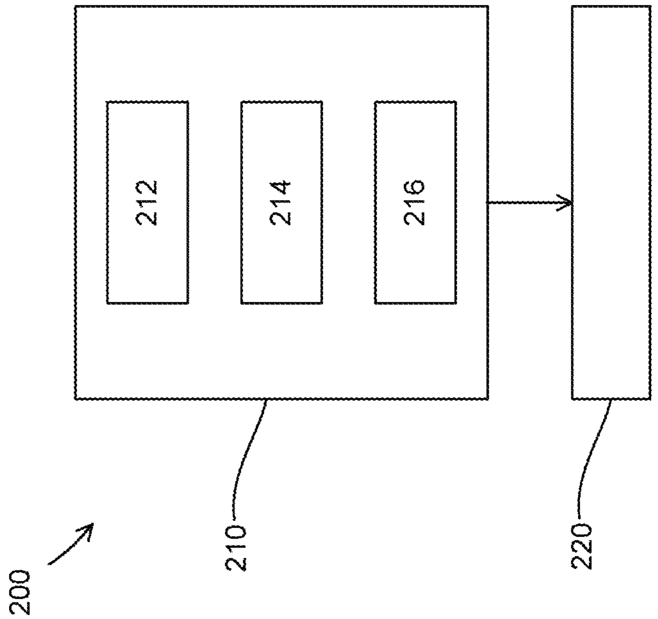
FIG. 7 is a schematic diagram of a new method of determining one or more aberrations of a projection system (for example the projection system of the lithographic system shown in FIG. 1) and which may be implemented by the measurement system shown in FIG. 6A.
Figure 8:
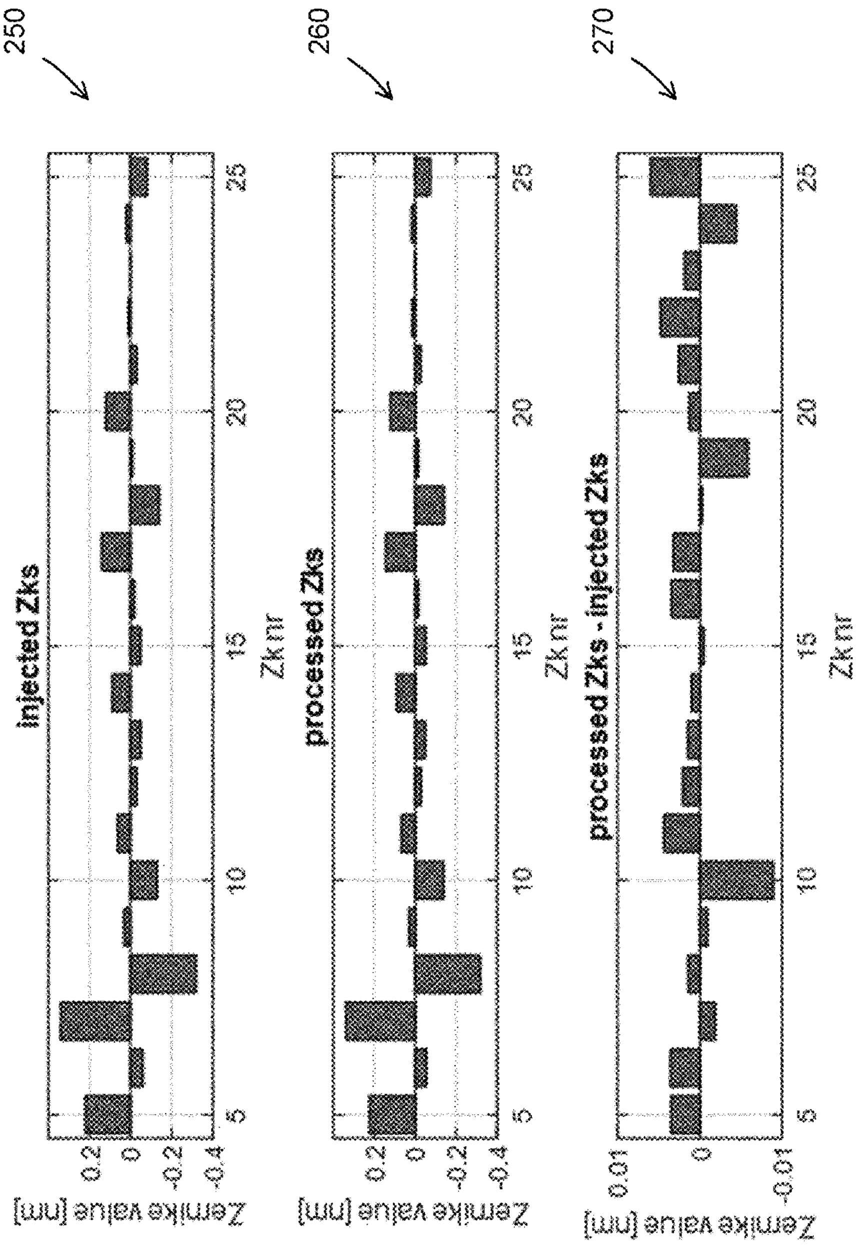
FIG. 8 shows the results of a simulation that has been performed to evaluate the performance of the method shown schematically in FIG. 7: a first plot shows, for the first 25 Zernike orders, an aberration footprint of the projection system that was input into the simulation: a second plot shows, for the first 25 Zernike orders, a reconstructed aberration footprint that was determined using the method of FIG. 7 (i.e. using a specular diffraction grating) using an illumination pupil fill of 20.7%; and a third plot shows a difference between the second plot and the first plot.

FIG. 8 shows the results of a simulation that has been performed to evaluate the performance of the method 200 shown in FIG. 7. A first plot 250 shows, for the first 25 Zernike orders, an aberration footprint of the projection system PS that was input into the simulation. A second plot 260 shows, for the first 25 Zernike orders, a reconstructed aberration footprint that was determined using the method 200 of FIG. 7 (i.e. using a specular diffraction grating 110). The simulation used an illumination mode wherein 20.7% of the illumination pupil plane is filled by the illumination radiation 150 used for illuminating the first patterning device 110 during step 212. Although only 20.7% of the illumination pupil plane is filled by the illumination radiation 150, the illumination radiation 150 is distributed generally evenly over the illumination pupil plane. A third plot 270 shows a difference between the second plot 260 and the first plot 250. As demonstrated by the small values of the third plot 270, it has been found that the injected Zernikes have been quite accurately reconstructed using the method 200 of FIG. 7 (i.e. using a specular diffraction grating 110) despite only approximately 20% of the illumination pupil plane being illuminated.

Figure 9:
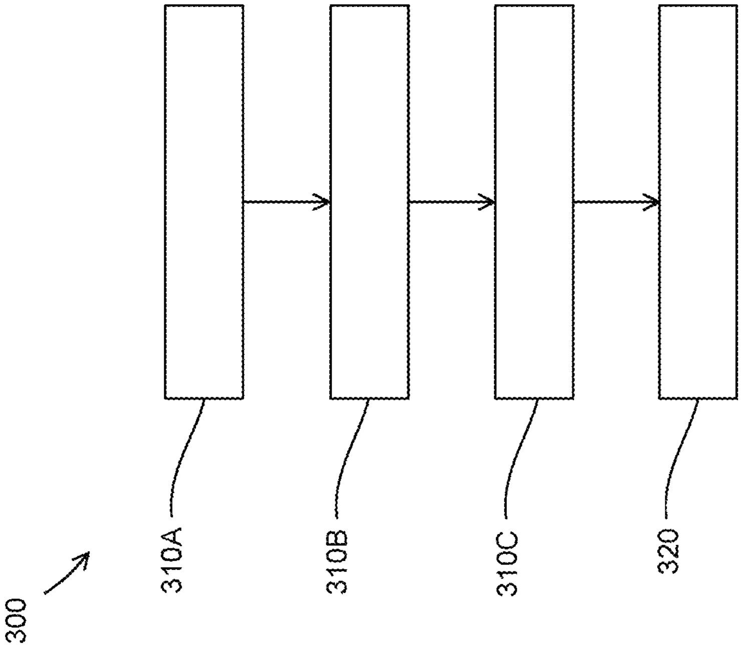
FIG. 9 is a schematic diagram of a second new method of determining one or more aberrations of a projection system and which may be implemented by the measurement system shown in FIG. 6A and which is a variant of the method shown in FIG. 7.

A second new method 300 for determining one or more aberrations of a projection system PS is now described with reference to FIGS. 9 and 10. The method 300 shown in FIG. 9 may be implemented by the measurement system 100 shown in FIG. 6A. The method 300 shown in FIG. 9 is a variant of the method 200 shown in FIG. 7 and described above. The method 300 shown in FIG. 9 is a form of shearing interferometry.

The second method 300 comprises: performing a plurality of phase stepping or phase scanning processes 330A. 330B. 330C; and a step 320 of determining one or more aberrations of the projection system PS therefrom.

Figure 10:
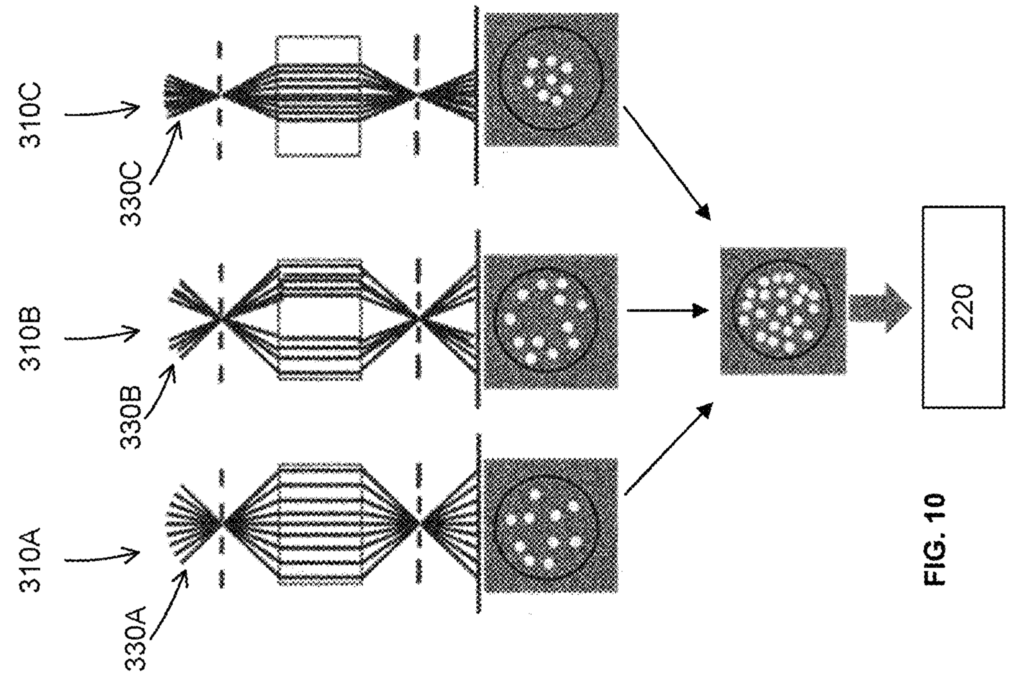
FIG. 10 is another schematic diagram of the second new method of determining one or more aberrations of a projection system as shown in FIG. 9.

As illustrated in FIG. 10, each of the plurality of phase stepping or phase scanning processes 310A. 310B. 310C is performed using a different illumination mode 330A. 330B. 330C. As such, different parts of the radiation detector 124 receive radiation during different ones of the plurality of phase stepping or phase scanning processes 310A. 310B. 310C. Otherwise each of the plurality of phase stepping or phase scanning processes 310A. 310B. 310C is similar to the other phase stepping or phase scanning processes. Each of the plurality of phase stepping or phase scanning processes 310A. 310B. 310C may be generally of the form of the phase stepping or phase scanning process 210 shown in FIG. 7 and described above. In particular, each of the plurality of phase stepping or phase scanning processes 310A. 310B. 310C may comprise: a step 212 of illuminating a first patterning device 110 with illumination radiation 150: a step 214 of projecting, with the projection system PS, at least part of the plurality of first diffraction beams onto a sensor apparatus 120; and a step 216 of moving at least one of the first and second patterning devices 110, 122 in the shearing direction such that an intensity of radiation received by each part of the radiation detector 124 that receives radiation varies as a function of the movement in the shearing direction so as to form an oscillating signal.

The step 320 of determining one or more aberrations of the projection system PS comprises using the oscillating signals determined by each part of the radiation detector that receives radiation from any one of the plurality of phase stepping or phase scanning processes 310A. 310B. 310C.

Advantageously, by performing a plurality of different phase-stepping or phase-scanning processes 310A. 310B. 310C, each using a different illumination mode 330A. 330B. 330C, each different phase-stepping or phase-scanning process 310A. 310B. 310C can probe a different part of the projection system PS pupil plane. Note that the aberrations or aberration map are not determined for each individual phase-stepping or phase-scanning process 310A. 310B. 310C and then combined. Rather, the aberrations or aberration map are determined using all of the plurality of phase-stepping or phase-scanning processes 310A. 310B. 310C. Advantageously, such embodiments allow a higher-resolution measurement of the aberrations of the projection system PS.

Figure 11:
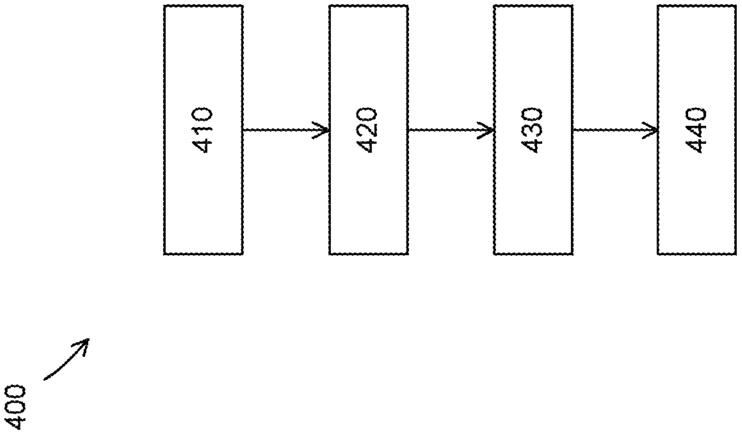
FIG. 11 is a schematic diagram of a third new method of determining one or more aberrations of a projection system and which may be implemented by the measurement system shown in FIG. 6A and which is a variant of the method shown in FIG. 7, the third method is a calibration method that uses shearing interferometry.

A third new method 400 for determining one or more aberrations of a projection system PS is now described with reference to FIG. 11. The method 400 shown in FIG. 11 may be implemented by the measurement system 100 shown in FIG. 6A. The method 400 shown in FIG. 11 is a variant of the method 200 shown in FIG. 7 and described above. The method 400 shown in FIG. 11 is a calibration method that uses shearing interferometry.

The calibration method 400 comprises: a step 410 of determining one or more aberrations of the projection system PS using an object-level specular diffraction grating 110 as part of a phase stepping or phase scanning process. This step 410 may be performed using either the method 200 shown in FIG. 7 or the method 300 shown in FIGS. 9 and 10.

The calibration method 400 further comprises: a step 420 of performing an additional phase stepping or phase scanning process using an object-level diffusive diffraction grating 110' (of the type shown in FIG. 6B and described above) so as to generate one or more additional oscillating signals. The calibration method 400 further comprises: a step 430 of determining one or more additional aberrations of the projection system PS from the one or more additional oscillating signals.

The calibration method 400 further comprises: a step 440 of determining calibration data which characterizes any differences between: (a) the determined one or more aberrations of the projection system PS (from step 410); and (b) the determined one or more additional aberrations of the projection system (from step 430).

Such an arrangement allows calibration data to be generated that can be used in subsequent measurements to correct additional aberrations of the projection system PS that are generated using a diffusive diffraction grating 110' as the first patterning device (at object plane level). Advantageously, this can allow potentially significant errors in the measurement of some aberrations (for example the amplitude of some Zernike orders in an aberration map of the projection system) using such a diffusive diffraction grating 110' as the first patterning device to be corrected away. This can allow subsequent aberration measurements to be made using a diffusive diffraction grating 110' as the first patterning device which, advantageously, may make the subsequent aberration measurement(s) faster, potentially increasing throughput of the lithographic apparatus LA.

The method 400 shown in FIG. 11 may further comprising storing the determined calibration data in memory.

Figure 12:
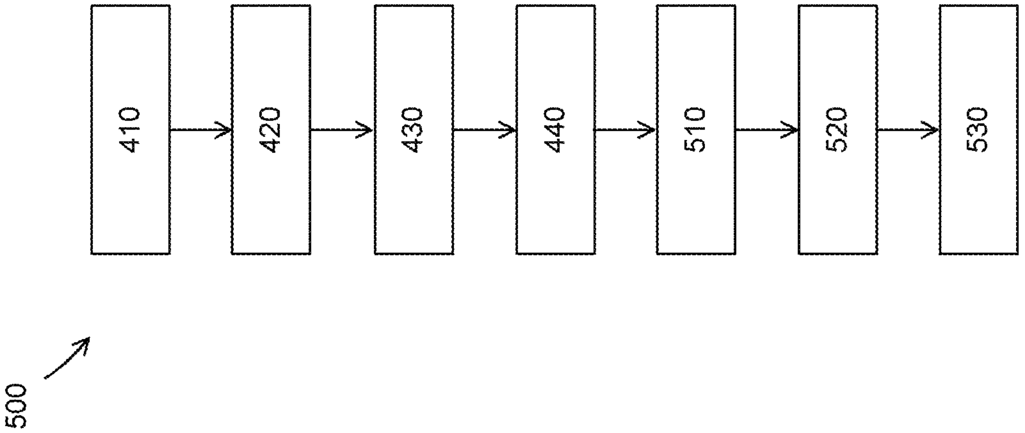
FIG. 12 is a schematic diagram of a fourth new method of determining one or more aberrations of a projection system and which may be implemented by the measurement system shown in FIG. 6A and which is a variant of the method shown in FIG. 11.

A fourth new method 500 for determining one or more aberrations of a projection system PS is now described with reference to FIG. 12. The method 500 shown in FIG. 12 may be implemented by the measurement system 100 shown in FIG. 6A. The method 500 shown in FIG. 12 is a variant of the method 400 shown in FIG. 11 and described above. The method 500 shown in FIG. 12 is a calibration method that uses shearing interferometry.

The method 500 shown in FIG. 12 comprise all of the steps 410, 420, 430, 440 of the method shown in FIG. 11.

The method 500 shown in FIG. 12 further comprises: a step 510 of performing a subsequent phase stepping or phase scanning process. The subsequent phase stepping or phase scanning process is performed using the diffusive diffraction grating 110' as the first patterning device but otherwise being similar to the or each other phase stepping or phase scanning process (for example those performed at steps 410 and 420).

The method 500 shown in FIG. 12 further comprises: a step 520 of determining one or more raw subsequent aberrations of the projection system PS from the oscillating signals determined by each part of the radiation detector 122 that receives radiation during the subsequent phase stepping or phase scanning process (step 510).

The method 500 shown in FIG. 12 further comprises: a step 530 of determining one or more corrected subsequent aberrations from the one or more raw subsequent aberrations of the projection system PS (determined at step 520) and the calibration data (determined at step 440).

It will be appreciated that any of the phase stepping or phase scanning processes described in any of the above-described methods 200, 300, 400, 500 (i.e. in any of steps 210, 210A-210C. 410, 420 or 510) may further comprise a second phase stepping or phase scanning process but which uses a second shearing direction. Such a second phase stepping or phase scanning process may comprise: (a) illuminating an object level patterning device with illumination radiation, wherein the first patterning device comprises a diffraction grating arranged to form a plurality of first diffraction beams, the first diffraction beams being separated in a second shearing direction: (b) projecting, with the projection system PS, at least part of the plurality of first diffraction beams onto the sensor apparatus 120; and moving at least one of the first and second patterning devices in the second shearing direction such that an intensity of radiation received by each part of the radiation detector that receives radiation varies as a function of the movement in the second shearing direction so as to form an oscillating signal.

For example, the first patterning device may comprise: a first portion arranged to shear the illumination radiation in the shearing direction; and a second portion arranged to shear the illumination radiation in the second shearing direction. During illumination of the first portion of the first patterning device, at least one of the first patterning device and the second patterning device is stepped in the shearing direction. This generates first phase-stepping data that, at least at first order, may be related to a gradient of the aberration map in the shearing direction. During illumination of the second portion of the first patterning device, at least one of the first patterning device and the second patterning device is stepped in the second shearing direction. This generates second phase-stepping data that, at least at first order, may be related to a gradient of the aberration map in the second shearing direction. The first and second phase-stepping data are combined to determine the one or more aberrations of the projection system. The first and second phase-stepping data may be combined to determine an aberration (or relative phase) map of the projection system.

Determination of any of the: one or more aberrations of the projection system PS (steps 220, 230); one or more additional aberrations of the projection system (step 430); or one or more raw subsequent aberrations of the projection system (step 520) from the oscillating signals determined by each part of the radiation detector 122 that receives radiation may comprise any known shearing interferometric techniques as desired or required. For example, determination of any of these aberrations may comprise any of the techniques disclosed above in relation to FIGS. 2 to 5C. Additionally or alternatively, determination of any of these aberrations may comprise any of the techniques disclosed in WO2019/149468, the contents of which is hereby incorporated by reference in its entirety. For the avoidance of doubt, determination of any of these aberrations may comprise any of the techniques disclosed in WO2019/149468 as prior art techniques and/or any techniques taught by WO2019/149468.

Determination of any of the: one or more aberrations of the projection system PS (steps 220, 230); one or more additional aberrations of the projection system (step 430); or one or more raw subsequent aberrations of the projection system (step 520) from the oscillating signals determined by each part of the radiation detector 122 that receives radiation may comprise equating a phase of a harmonic of the oscillating signal received by each part of the radiation detector 122 that receives radiation to a sum of at least one difference in the aberration map between a pair of positions in a pupil plane of the projection system PS. The harmonic of the oscillating signal may be the first harmonic of the oscillating signal.

Some embodiments of the present disclosure relate to a computer readable medium carrying a computer program comprising computer readable instructions configured to cause a computer to carry out one or more of the methods 200, 300, 400, 500 shown in FIGS. 7 to 12 and described above.

Some embodiments of the present disclosure relate to a computer apparatus comprising: a memory storing processor readable instructions, and a processor arranged to read and execute instructions stored in said memory, wherein said processor readable instructions comprise instructions arranged to control the computer to carry out one or more of the methods 200, 300, 400, 500 shown in FIGS. 7 to 12 and described above.

In some embodiments, the diffraction gratings discussed above may be self-supporting. In use, the diffraction gratings may be provided with a support for the absorbing layer. The support may only contact a peripheral portion of the absorbing layer. That is, the support may be of the form of a frame and which does is not adjacent to a central portion of the absorbing layer. With such an arrangement, in a central portion of the absorbing layer, the absorbing layer may be considered to be self-supporting. To achieve this, the absorbing layer may be tensioned on the support (for example such that it remains generally planar).

Advantageously, for embodiments wherein the central portion of the absorbing layer is self-supporting, the grating does not need, for example, a transmissive supporting layer. Such an arrangement is particularly beneficial for use in a phase-stepping measurement system for determining an aberration map for a projection system that uses EUV radiation since the use of such a transmissive supporting layer would significantly reduce the amount of EUV radiation that is transmitted by the diffraction grating.

In some embodiments, in the diffraction gratings discussed above, the substrate (in which the apertures are formed) comprises a radiation absorbing layer. The radiation absorbing layer may, for example, be formed from a metal such as, for example, chromium (Cr), nickel (Ni), cobalt (Co) or aluminium (Al).

In some embodiments, the absorbing layer may comprise a ceramic. The ceramic may comprise a metal or metalloid component having a relatively high extinction coefficient for EUV radiation and a non-metal component. Both components may have a refractive index for EUV which is relatively close to 1. The ceramic may comprise aluminium nitride (AlN). In some embodiments, the absorbing layer may comprise aluminium nitride (AlN).

In some embodiments, in the diffraction gratings discussed above, the substrate (in which the apertures are formed) further comprises a support layer. The through-apertures may extend through both the support layer and the radiation absorbing layer. The support layer may, for example, be formed from SiN.

Although the above described embodiments use the first harmonic of the a phase stepping signal it will be appreciated that in alternative embodiments higher harmonics of the phase stepping signal may alternatively be used.

Although the above described embodiments use a first patterned region 31 comprising a one-dimensional diffraction grating 31 with a 50% duty cycle it will be appreciated that in alternative embodiments other the first patterned region 31 may use different geometries. For example, in some embodiments, the first patterned region 31 may comprise a two-dimensional checkerboard diffraction grating with a 50% duty cycle.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Where the context allows, embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM): random access memory (RAM); magnetic storage media: optical storage media: flash memory devices: electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. and in doing that may cause actuators or other devices to interact with the physical world.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

Clauses

1. A method of determining one or more aberrations of a projection system, the method comprising:

performing a phase stepping or phase scanning process, the phase stepping or phase scanning process comprising:

illuminating a first patterning device with illumination radiation, wherein the first patterning device comprises a specular diffraction grating arranged to form a plurality of first diffraction beams, the first diffraction beams being separated in a shearing direction;

projecting, with the projection system, at least part of the plurality of first diffraction beams onto a sensor apparatus comprising:

a second patterning device arranged to receive the first diffraction beams from the projection system and to form a plurality of second diffraction beams from each of the first diffraction beams; and a radiation detector arranged to receive at least a portion of the second diffraction beams; and moving at least one of the first and second patterning devices in the shearing direction such that an intensity of radiation received by each part of the radiation detector that receives radiation varies as a function of the movement in the shearing direction so as to form an oscillating signal; and determining one or more aberrations of the projection system from the oscillating signals determined by each part of the radiation detector that receives radiation.

2 The method of clause 1 wherein the method comprises:

performing a plurality of phase stepping or phase scanning processes, each of the plurality of phase stepping or phase scanning processes being performed using a different illumination mode such that different parts of the radiation detector receive radiation during different ones of the plurality of phase stepping or phase scanning processes but otherwise being similar to the other phase stepping or phase scanning processes; and wherein the step of determining one or more aberrations of the projection system comprises using the oscillating signals determined by each part of the radiation detector that receives radiation from any one of the plurality of phase stepping or phase scanning processes.

3. The method of clause 1 or clause 2 further comprising:

performing an additional phase stepping or phase scanning process, the additional phase stepping or phase scanning process being performed using a diffusive diffraction grating as the first patterning device but otherwise being similar to the or each other phase stepping or phase scanning process;

determining one or more additional aberrations of the projection system from the oscillating signals determined by each part of the radiation detector that receives radiation during the additional phase stepping or phase scanning process; and determining calibration data which characterizes any differences between: (a) the determined one or more aberrations of the projection system; and (b) the determined one or more additional aberrations of the projection system.

4. The method of clause 3 further comprising storing the determined calibration data in memory.

5. A calibration method, the method comprising:

performing a phase stepping or phase scanning process using an object-level specular diffraction grating so as to generate one or more oscillating signals;

determining one or more aberrations of the projection system from the one or more oscillating signals; performing an additional phase stepping or phase scanning process using an object-level diffusive diffraction grating so as to generate one or more additional oscillating signals;

determining one or more additional aberrations of the projection system from the one or more additional oscillating signals; and determining calibration data which characterizes any differences between: (a) the determined one or more aberrations of the projection system; and (b) the determined one or more additional aberrations of the projection system.

6 The method of any one of clauses 3 to 5 further comprising:

performing a subsequent phase stepping or phase scanning process, the subsequent phase stepping or phase scanning process being performed using the diffusive diffraction grating as the first patterning device but otherwise being similar to the or each other phase stepping or phase scanning process;

determining one or more raw subsequent aberrations of the projection system from the oscillating signals determined by each part of the radiation detector that receives radiation during the subsequent phase stepping or phase scanning process; and determining one or more corrected subsequent aberrations from the one or more raw subsequent aberrations of the projection system and the calibration data.

7 The method of any preceding clause wherein the illumination radiation comprises extreme ultraviolet radiation.

8. The method of any preceding clause wherein the first patterning device is provided on a fiducial.

9. The method of any preceding clause wherein the first patterning device is provided on a reticle.

10. The method of any preceding clause wherein any phase stepping or phase scanning processes further comprises:

illuminating the first patterning device with illumination radiation, wherein the first patterning device comprises a specular diffraction grating arranged to form a plurality of first diffraction beams, the first diffraction beams being separated in a second shearing direction;

projecting, with the projection system, at least part of the plurality of first diffraction beams onto the sensor apparatus; and moving at least one of the first and second patterning devices in the second shearing direction such that an intensity of radiation received by each part of the radiation detector that receives radiation varies as a function of the movement in the second shearing direction so as to form an oscillating signal.

11. The method of any preceding clause wherein determination of any of the: one or more aberrations of the projection system; one or more additional aberrations of the projection system; or one or more raw subsequent aberrations of the projection system from the oscillating signals determined by each part of the radiation detector that receives radiation comprises:

equating a phase of a harmonic of the oscillating signal received by each part of the radiation detector that receives radiation to a sum of at least one difference in the aberration map between a pair of positions in a pupil plane of the projection system.

12. A computer readable medium carrying a computer program comprising computer readable instructions configured to cause a computer to carry out a method according to any one of clauses 1 to 11.

13. A computer apparatus comprising:

a memory storing processor readable instructions, and a processor arranged to read and execute instructions stored in said memory, wherein said processor readable instructions comprise instructions arranged to control the computer to carry out the method according to any one of clauses 1 to 11.

14. A measurement system for determining one or more aberrations of a projection system, the measurement system comprising:

a first patterning device wherein the first patterning device comprises a specular diffraction grating:

a sensor apparatus comprising a second patterning device and a radiation detector, the first patterning device and the sensor apparatus being positionable such that the projection system can form an image of the first patterning device on the second patterning device with illumination radiation and such that the radiation detector is arranged to receive the illumination radiation after it has passed through the second patterning device;

a positioning apparatus configured to move at least one of the first patterning device and the sensor apparatus; and a controller configured to:

control the positioning apparatus so as to move at least one of the first patterning device and the sensor apparatus in a shearing direction such that an intensity of radiation received by each part of the radiation detector varies as a function of the movement in the shearing direction so as to form an oscillating signal;

determine from the radiation detector a phase of a harmonic of the oscillating signal at a plurality of positions on the radiation detector; and determine at least one coefficient that characterizes at least one aberration of the projection system from the phase of a harmonic of the oscillating signal at the plurality of positions on the radiation detector.

15. The system of clause 14 wherein the controller is configured to carry out the method according to any one of clauses 1 to 11.

16. The system of clause 14 or clause 15 further comprising an illumination system operable to illuminate the first patterning device with illumination radiation.

17. The system of clause 16 wherein the illumination radiation comprises extreme ultraviolet radiation.

18. The system of any one of clauses 14 to 17 wherein the first patterning device is provided on a fiducial.

19. The system of any one of clauses 14 to 18 wherein the first patterning device is provided on a reticle.

20. A lithographic apparatus comprising the measurement system of any one of clauses 14 to 19.

The invention claimed is:

1. A method of determining one or more aberrations of a projection system, the method comprising:

performing a phase stepping or phase scanning process, the phase stepping or phase scanning process comprising:

illuminating a first patterning device with illumination radiation, wherein the first patterning device comprises a specular diffraction grating arranged to form a plurality of first diffraction beams, the first diffraction beams being separated in a shearing direction;

projecting, with the projection system, at least part of the plurality of first diffraction beams onto a sensor apparatus, the sensor apparatus comprising:

a second patterning device arranged to receive the first diffraction beams from the projection system and to form a plurality of second diffraction beams from each of the first diffraction beams; and a radiation detector arranged to receive at least a portion of the second diffraction beams; and moving the first and/or second patterning device in the shearing direction such that an intensity of radiation received by each part of the radiation detector that receives radiation varies as a function of the movement in the shearing direction so as to form an oscillating signal; and determining one or more aberrations of the projection system from the oscillating signals determined by each part of the radiation detector that receives radiation.

2. The method of claim 1, comprising performing a plurality of phase stepping or phase scanning processes, each of the plurality of phase stepping or phase scanning processes being performed using a different illumination mode such that different parts of the radiation detector receive radiation during different ones of the plurality of phase stepping or phase scanning processes; and wherein the determining one or more aberrations of the projection system comprises using the oscillating signals determined by each part of the radiation detector that receives radiation from any one of the plurality of phase stepping or phase scanning processes.

3. The method of claim 1, further comprising:

performing an additional phase stepping or phase scanning process, the additional phase stepping or phase scanning process being performed using a diffusive diffraction grating as the first patterning device;

determining one or more additional aberrations of the projection system from the oscillating signals determined by each part of the radiation detector that receives radiation during the additional phase stepping or phase scanning process; and determining calibration data which characterizes any differences between: (a) the determined one or more aberrations of the projection system; and (b) the determined one or more additional aberrations of the projection system.

4. A calibration method comprising:

performing a phase stepping or phase scanning process using an object-level specular diffraction grating so as to generate one or more oscillating signals;

determining one or more aberrations of a projection system from the one or more oscillating signals;

performing an additional phase stepping or phase scanning process using an object-level diffusive diffraction grating so as to generate one or more additional oscillating signals;

determining one or more additional aberrations of the projection system from the one or more additional oscillating signals; and determining calibration data which characterizes any differences between: (a) the determined one or more aberrations of the projection system; and (b) the determined one or more additional aberrations of the projection system.

5. The method of claim 4, further comprising:

performing a subsequent phase stepping or phase scanning process, the subsequent phase stepping or phase scanning process being performed using the diffusive diffraction grating as the first patterning device;

determining one or more raw subsequent aberrations of the projection system from the oscillating signals determined by each part of the radiation detector that receives radiation during the subsequent phase stepping or phase scanning process; and determining one or more corrected subsequent aberrations from the one or more raw subsequent aberrations of the projection system and the calibration data.

6. The method of claim 1, wherein the illumination radiation comprises extreme ultraviolet radiation.

7. The method of claim 1, wherein the first patterning device is provided on a fiducial or/and on a reticle.

8. The method of claim 1, wherein the phase stepping or phase scanning process further comprises:

illuminating the first patterning device with illumination radiation, wherein the first patterning device comprises a specular diffraction grating arranged to form a plurality of first diffraction beams, the first diffraction beams being separated in a second shearing direction;

projecting, with the projection system, at least part of the plurality of first diffraction beams separated in the second shearing direction onto the sensor apparatus; and moving the first and/or second patterning device in the second shearing direction such that an intensity of radiation received by each part of the radiation detector that receives radiation varies as a function of the movement in the second shearing direction so as to form an oscillating signal.

9. The method of claim 1, wherein determining the one or more aberrations of the projection system from the oscillating signals determined by each part of the radiation detector that receives radiation comprises equating a phase of a harmonic of the oscillating signal received by each part of the radiation detector that receives radiation to a sum of at least one difference in the aberration map between a pair of positions in a pupil plane of the projection system.

10. A measurement system comprising:

a first patterning device comprising a specular diffraction grating;

a sensor apparatus comprising a second patterning device and a radiation detector, the first patterning device and the sensor apparatus being positionable such that a projection system can form an image of the first patterning device on the second patterning device with illumination radiation and such that the radiation detector is arranged to receive the illumination radiation after it has passed via the second patterning device;

a positioning apparatus configured to move the first patterning device and/or the sensor apparatus; and a controller configured to:

control the positioning apparatus so as to move the first patterning device and/or the sensor apparatus in a shearing direction such that an intensity of radiation received by each part of the radiation detector varies as a function of the movement in the shearing direction so as to form an oscillating signal;

determine, from the radiation detector, a phase of a harmonic of the oscillating signal at a plurality of positions on the radiation detector; and determine at least one coefficient that characterizes at least one aberration of the projection system from the phase of a harmonic of the oscillating signal at the plurality of positions on the radiation detector.

11. The system of claim 10, further comprising an illumination system operable to illuminate the first patterning device with illumination radiation.

12. The system of claim 11, wherein the illumination radiation comprises extreme ultraviolet radiation.

13. The system of claim 11, wherein the first patterning device is provided on a fiducial or/and on a reticle.

14. A lithographic apparatus comprising the measurement system of claim 10.

15. A non-transitory computer-readable medium comprising instructions stored therein, the instructions, when executed by a computer system, configured to cause the computer system to at least:

cause performance of a phase stepping or phase scanning process, the phase stepping or phase scanning process comprising:

illumination of a first patterning device with illumination radiation, wherein the first patterning device comprises a specular diffraction grating arranged to form a plurality of first diffraction beams, the first diffraction beams being separated in a shearing direction;

projection, with a projection system, at least part of the plurality of first diffraction beams onto a sensor apparatus, the sensor apparatus comprising:

a second patterning device arranged to receive the first diffraction beams from the projection system and to form a plurality of second diffraction beams from each of the first diffraction beams; and a radiation detector arranged to receive at least a portion of the second diffraction beams; and movement of the first and/or second patterning device in the shearing direction such that an intensity of radiation received by each part of the radiation detector that receives radiation varies as a function of the movement in the shearing direction so as to form an oscillating signal; and determine one or more aberrations of the projection system from the oscillating signals determined by each part of the radiation detector that receives radiation.

16. The medium of claim 15, wherein the instructions are further configured to cause the computer system to cause performance of a plurality of phase stepping or phase scanning processes, each of the plurality of phase stepping or phase scanning processes performed using a different illumination mode such that different parts of the radiation detector receive radiation during different ones of the plurality of phase stepping or phase scanning processes; and wherein the instructions configured to cause the computer to determine one or more aberrations of the projection system are further configured to cause the computer system to use the oscillating signals determined by each part of the radiation detector that receives radiation from any one of the plurality of phase stepping or phase scanning processes.

17. The medium of claim 15, wherein the instructions are further configured to cause the computer system to:

cause performance of an additional phase stepping or phase scanning process, the additional phase stepping or phase scanning process performed using a diffusive diffraction grating as the first patterning device;

determine one or more additional aberrations of the projection system from the oscillating signals determined by each part of the radiation detector that receives radiation during the additional phase stepping or phase scanning process; and determine calibration data which characterizes any differences between: (a) the determined one or more aberrations of the projection system; and (b) the determined one or more additional aberrations of the projection system.

18. The medium of claim 15, wherein the phase stepping or phase scanning process further comprises:

illumination of the first patterning device with illumination radiation, wherein the first patterning device comprises a specular diffraction grating arranged to form a plurality of first diffraction beams, the first diffraction beams being separated in a second shearing direction;

projection, with the projection system, of at least part of the plurality of first diffraction beams separated in the second shearing direction onto the sensor apparatus; and movement of the first and/or second patterning device in the second shearing direction such that an intensity of radiation received by each part of the radiation detector that receives radiation varies as a function of the movement in the second shearing direction so as to form an oscillating signal.

19. The medium of claim 15, wherein the instructions configured to cause the computer system to determine the one or more aberrations of the projection system from the oscillating signals determined by each part of the radiation detector that receives radiation are further configured to cause the computer system to equate a phase of a harmonic of the oscillating signal received by each part of the radiation detector that receives radiation to a sum of at least one difference in the aberration map between a pair of positions in a pupil plane of the projection system.

20. A non-transitory computer-readable medium comprising instructions stored therein, the instructions, when executed by a computer system, configured to cause the computer system to cause performance of at least the method of claim 4.

* * * * *